(12) United States Patent
Xu et al.

(10) Patent No.: US 11,747,827 B2
(45) Date of Patent: Sep. 5, 2023

(54) VEHICLE PLATOON SYSTEM CONTROL FOR INTERSECTIONS

(71) Applicant: HERE Global B.V., Eindhoven (NL)

(72) Inventors: Jingwei Xu, Buffalo Grove, IL (US); Bruce Bernhardt, Wauconda, IL (US)

(73) Assignee: HERE Global B.V., Eindhoven (NL)

( * ) Notice: Subject to any disclaimer, the term of this patent is extended or adjusted under 35 U.S.C. 154(b) by 177 days.

(21) Appl. No.: 15/896,348

(22) Filed: Feb. 14, 2018

(65) Prior Publication Data
US 2019/0250639 A1    Aug. 15, 2019

(51) Int. Cl.
| | |
|---|---|
| G05D 1/02 | (2020.01) |
| G08G 1/00 | (2006.01) |
| G08G 1/0968 | (2006.01) |
| G08G 1/0967 | (2006.01) |
| G08G 1/01 | (2006.01) |

(Continued)

(52) U.S. Cl.
CPC ......... *G05D 1/0293* (2013.01); *G05D 1/0223* (2013.01); *G05D 1/0297* (2013.01); *G08G 1/0112* (2013.01); *G08G 1/0133* (2013.01); *G08G 1/0145* (2013.01); *G08G 1/096725* (2013.01); *G08G 1/096741* (2013.01); *G08G 1/096775* (2013.01); *G08G 1/096822* (2013.01); *G08G 1/096827* (2013.01);
(Continued)

(58) Field of Classification Search
CPC ... G05D 1/0297; G08G 1/096822; G08G 1/22
USPC ........................................................ 701/482
See application file for complete search history.

(56) References Cited

U.S. PATENT DOCUMENTS

| | | |
|---|---|---|
| 8,352,111 B2 | 1/2013 | Mudalige |
| 8,471,728 B2 | 6/2013 | Flaherty |

(Continued)

FOREIGN PATENT DOCUMENTS

| | | |
|---|---|---|
| CN | 101859494 A | 10/2010 |
| CN | 102592462 A | 7/2012 |

(Continued)

OTHER PUBLICATIONS

J.D. Schneeberger, "Application for the Environment: Real-Time Information Synthesis (AERIS)." U.S. Department of Transportation, Office of teh Assistant Secretary for Research and Technology power point. (Jun. 6, 2014). (Year: 2014).*

(Continued)

*Primary Examiner* — Maceeh Anwari
(74) *Attorney, Agent, or Firm* — LEMPIA SUMMERFIELD KATZ LLC

(57) ABSTRACT

A vehicle platoon control system performs techniques for controlling a platoon of vehicles through an intersection. The platoon of vehicles is controlled through receiving location data for at least a first vehicle of the platoon of vehicles, map matching the location data for the first vehicle to a road network, identifying an intersection in the road network in response to the matched location data, determining a time period for the intersection, calculating a distance to the intersection for a second vehicle of the platoon of vehicles, calculating a travel time based on the distance to the intersection for the second vehicle of the platoon of vehicles, performing a comparison of the time period for the intersection to the travel time for the second vehicle, and generating a platoon command in response to the comparison.

19 Claims, 13 Drawing Sheets

(51) Int. Cl.
*B60W 50/04* (2006.01)
*G08G 1/07* (2006.01)

(52) U.S. Cl.
CPC ......... *G08G 1/22* (2013.01); *B60W 2050/048* (2013.01); *G05D 2201/0213* (2013.01); *G08G 1/07* (2013.01)

(56) References Cited

U.S. PATENT DOCUMENTS

| | | | |
|---|---|---|---|
| 9,672,734 | B1 | 6/2017 | Ratnasingam |
| 2010/0256835 | A1* | 10/2010 | Mudalige ............... G08G 1/163 701/2 |
| 2016/0019782 | A1 | 1/2016 | Alam et al. |
| 2016/0163200 | A1 | 6/2016 | He et al. |
| 2016/0328968 | A1 | 11/2016 | Elsheemy |
| 2019/0206260 | A1 | 7/2019 | Pilkington |

FOREIGN PATENT DOCUMENTS

| | | | |
|---|---|---|---|
| CN | 106297324 B | * | 1/2017 |
| CN | 106780272 A | | 5/2017 |
| JP | 2009250637 A | | 10/2009 |
| JP | 2012238169 A | | 12/2012 |
| WO | WO2017070373 A1 | * | 4/2017 |

OTHER PUBLICATIONS

Shladover, Steven E., et al. "Cooperative adaptive cruise control: Definitions and operating concepts." Transportation Research Record: Journal of the Transportation Research Board 2489 (2015):p. 145-152. (Year: 2015).*

European Search Report for European Patent Application No. 19156776.7-1204 dated Jul. 2, 2019.

Shladover, Steven E., et al. "Cooperative adaptive cruise control: Definitions and operating concepts." Transportation Research Record: Journal of the Transportation Research Board 2489 (2015): 145-152.

Tiernan, Tim, et al. Test and evaluation of vehicle platooning proof-of-concept based on cooperative adaptive cruise control. No. DOT-VNTSC-FHWA-17-13. John A. Volpe National Transportation Systems Center (US), 2017.

European Office Action for European Patent Application No. 19 156 776.7-1202 dated Nov. 30, 2020.

Chinese Office Action from Chinese Patent Application No. 201910116097.5, dated Feb. 7, 2022, 11 pages including English summary.

Chinese Search Report for Chinese Patent Application No. 2019101160975, dated Jan. 25, 2022.

Chinese Office Action from Chinese Patent Application No. 201910116097.5, dated Nov. 3, 2022, 9 pages. (including English summary).

* cited by examiner

VEHICLE PLATOON SYSTEM CONTROL FOR INTERSECTIONS

FIELD

The following disclosure relates to the control of vehicle platoons in relationships to one or more intersections.

BACKGROUND

The Global Positioning System (GPS) or another global navigation satellite system (GNSS) provides location information to a receiving device anywhere on Earth as long as the device has a substantial line of sight without significant obstruction to three or four satellites of the system. Highly automated driving (HAD) and autonomous driving technology utilize GNSS data to automate various driving tasks.

HAD and autonomous driving technologies may be used in platooning in which vehicles are organized into groups or platoons on a roadway. The platoons may be groups of buses for public transportation, groups of trucks for shipping, or groups of passenger vehicles that are associated with each other. Challenges arise in platooning vehicles in HAD and autonomous driving technologies that may be improved with specialized algorithms for controlling the platoon vehicles.

SUMMARY

In one embodiment, a method for controlling a platoon of vehicles through an intersection includes receiving location data for at least a first vehicle of the platoon of vehicles, map matching the location data for the first vehicle to a road network, identifying an intersection in the road network in response to the matched location data, determining a time period for the intersection, calculating, by a processor, a distance to the intersection for a second vehicle of the platoon of vehicles, calculating, by the processor, a travel time based on the distance to the intersection for the second vehicle of the platoon of vehicles, performing, by the processor, a comparison of the time period for the intersection to the travel time for the second vehicle, and generating, by the processor, a platoon command in response to the comparison.

In another embodiment, an apparatus includes a location module, a geographic database, an intersection module, a timing module, and a controller. The location module is configured to receive location data for at least a vehicle of the platoon of vehicles. The geographic database is configured to store data indicative of a road network. The intersection module is configured to match the location data for the vehicle to an intersection of the road network stored in the geographic database. The timing module is configured to identify a time period for the intersection of the road network matched with the location data for the vehicle. The controller is configured to calculate a travel time to the intersection and configured to perform a comparison of the time period for the intersection to the travel time to the intersection and generate a platoon command in response to the comparison.

In another embodiment, a non-transitory computer readable medium including instructions to perform a method including, generating, using position circuitry, location data for a platoon of vehicles, sending the location data to a server, receiving, from the server, intersection data for an upcoming intersection, the intersection data indicative of a passable phase of the intersection, performing a determination of whether the platoon of vehicles can pass the upcoming intersection without interruption, and generating a platoon command in response to the determination of whether the platoon of vehicles can pass the upcoming intersection without interruption.

BRIEF DESCRIPTION OF THE DRAWINGS

Exemplary embodiments of the present invention are described herein with reference to the following drawings.

DETAILED DESCRIPTION

Figure 1A:
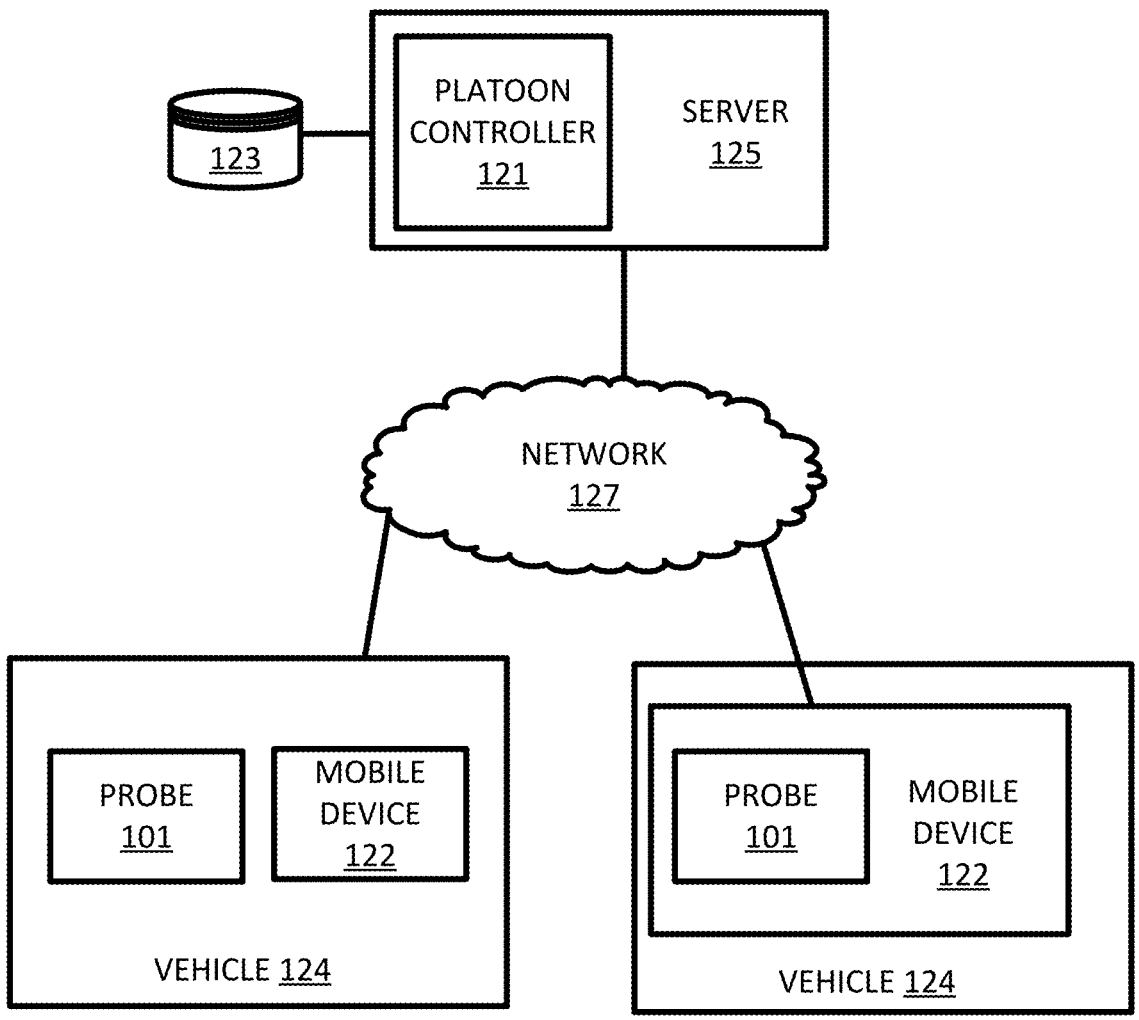
FIG. 1A illustrates an example system for controlling a platoon of vehicles.

With the improvements of HAD and autonomous driving technology development, vehicle platoon systems including truck platoon system have become a focus in the industry. Vehicle platoon system may reduce fuel consumption, increase the capacity of roads and provide a steady state traffic flow. These factors may bring a huge economic effect.

A vehicle platoon is a group of vehicles that are coordinated in a group. The vehicle platoon may maintain specific distances between vehicles, specific speeds, or a specific pattern or arrangement (e.g., nose-to-tail line) of vehicles. The vehicle platoon may be controlled through vehicle to vehicle communication or through communication with a central controller.

A vehicle platoon system may have one lead vehicle. The lead vehicle may transmit commands to other vehicles in the platoon. The lead vehicle may travel at the beginning or head of the pattern of the platoon. The lead vehicle is followed by a series of vehicles (e.g., follower vehicles) that may closely maintain the speed, distance, and maneuvers of the lead vehicle. The lead vehicle could authorize a vehicle driving nearby to join the platoon system by accepting the join platoon request or dissociate a vehicle in the vehicle platoon system by approving the dissociation request.

The early phase of a vehicle platoon system may require the vehicle driver to fulfill the operation command, but eventually while to the autonomous driving stage all vehicles may be able to automatically cooperate the driving strategy instructions like join or leave platoons.

In area of traffic control, an intersection plays a critical role for traffic flow management. In one example, an intersection may be a node in which two or more road segments meet or intersect. The intersection may be a location where two roads cross or one road terminates and another road (e.g., T-intersection). The intersection may be a signalized intersection in which a traffic signal regulates travel through the intersection. The intersection may be a ramp intersection in which a ramp or merging path connects one roadway to a highway. The intersection may be a signed intersection in which stop signs or another type of sign regulate flow through the intersection.

For signalized intersections, when the intersection has the traffic signal installed to provide intersection movement, state control strategies ensures the vehicle capacity and safety driving on the roads. That is, the number of vehicles on the roadway is maximized while incidents are minimized. For example, the traffic light has its own assigned signal phase and timing (SPaT) control strategies. With the knowledge of such information, traffic service providers or traffic management agencies are able to provide several benefits. The benefits may include energy saving by avoiding the unnecessary vehicle acceleration and deceleration (i.e., a driver may be instructed of the upcoming traffic signal and slow down in order to avoid stopping at a red light), dynamically adjusting navigation plan to reduce the travel time, and safety warning and alerts to persons crossing the streets.

The SPaT information along with MAP data that describes lane level detail of the roadway and intersection may be delivered through cellular network, dedicated short range communication (DSRC), or another wireless communication technique while a vehicle is approaching to an intersection within the certain distance.

The following embodiments utilize traffic signaling data (e.g., SPaT) and/or intersection data (e.g., MAP data) to control a platoon of vehicles with respect to an intersection in a road network. The following embodiments relate to several technological fields including but not limited to navigation, autonomous driving, assisted driving, and traffic flow control. The following embodiments achieve advantages in fuel consumption, roadway capacity, safety, and travel time.

The vehicle platoon control system allows the vehicle platoon to maintain a cohesive group or formation by predicting the state of intersections and adjusting the vehicle platoon so that the intersection does not interrupt the group or formation. Maintaining the cohesion of the platoon improves the fuel consumption because vehicles are maintained at a nearly constant speed by reducing fluctuations in acceleration and deceleration, which decrease fuel efficiency in conventional driving. Maintaining the cohesion of the platoon improves the fuel consumption because smaller distances may be maintained between the vehicles which improves the reduction in drag. In addition, the vehicle platoon reduces congestion and traffic. Smaller spaces between vehicles and constant speeds mean that more vehicles fit on a given stretch of roadway, which reduces congestion. Finally, the vehicle platoon improves safety of passengers of the vehicle platoon and nearby pedestrians.

The vehicle platoon control system is in the technological field of navigation. Improvements to navigation include the simplification of navigation instructions for maintaining the cohesion or pattern of the platoon group. When a platoon separates, additional routing is required to bring the platoon back together. When the platoon is maintained this additional routed is avoided. The efficiency of the navigation computers is improved because fewer calculations are needed when interruptions in the platoon are avoided. The vehicle platoon control system is in the technological field of traffic control in that flow through an intersection is improved. Improved flow through the intersection improves fuel efficiency of the vehicles that are maintaining greater speeds.

As described above, though a vehicle platoon system can bring many benefits like a decrease in fuel consumption and an improvement in traffic flow for autonomous vehicle platoon systems. For vehicle platoons, driving through highway or arterial roads with signalized intersection, stop signs, entrance or exit ramps are facing technical challenges.

In the signalized intersection case, the lead vehicle might drive through such intersections including a left turn, a right turn, or driving straight without leaving enough time for the following vehicles in the platoon to drive through, which may cause the intersection to be congested. In a stop sign intersection case, the stop sign may change the pattern of the vehicles by interrupting the spacing between vehicles and the speed of the vehicles. A regulation change may be required to allow a group of vehicles in a platoon system to cross an intersection at the same time without needing to wait for opposing traffic to cross. For highway ramp entrances and exits, a ramp entrance and exit may be congested, and as a result, the vehicle platoon system could not fit on the ramp or otherwise cannot drive onto the ramp without causing even more road congestion.

The following embodiments establish a specific algorithm to control an autonomous vehicle platoon system, or another type of platoon, to successfully drive through these road geometries.

FIG. 1A illustrates an example system for controlling a platoon of vehicles. In FIG. 1, one or more vehicles 124 are connected to the server 125 though the network 127. The vehicles 124 may be directly connected to the server 125 or through an associated mobile device 122. A map developer system 121, including the server 125 and a geographic database 123, exchanges (e.g., receives and sends) data from the vehicles 124. The mobile devices 122 may include local databases corresponding to a local map, which may be modified according to the server 125. The local map may include a subset of the geographic database 123 and are updated or changed as the vehicles 124 travel. The mobile devices 124 may be standalone devices such as smartphones or devices integrated with vehicles. Additional, different, or fewer components may be included.

Each vehicle 124 and/or mobile device 122 may include position circuitry such as one or more processors or circuits for receiving GNSS signals and comparing the GNSS signals to a clock to determine the absolute or relative position of the vehicle 124 and/or mobile device 122. The mobile device 122 may act as probe 101 for determining the position or the mobile device 122 and the probe 101 may be separate devices. The absolute or relative position may be stored as location data. The location data may include geographic coordinates (e.g., longitude and latitude) or include one or more distances from the front of the platoon or the lead vehicle of the platoon. In one example, the relative location data is distance measured in two dimensions (e.g., the x and y directions), and in another example, the relative location data is distance measured in one dimension (e.g., the direction of the road segment).

The server 125 receives the location data from at least one and up to all of the vehicles 124 in the platoon of vehicles. The server 125 may receive the location data from only the lead vehicle in the platoon of vehicles.

The platoon of vehicles may be defined in a variety of techniques. The platoon of vehicles may be an ad hoc platoon formed on the fly. That is, the vehicles may have no previous affiliation and may form the platoon according to their destination or according to user instruction. In one example, the vehicles are grouped in the platoon according to their destination. The server 125 may receive destination information from multiple vehicles and assign vehicles with the same or nearby destinations to a platoon. Assigning the vehicles to a platoon may involve sending driving commands (e.g., steering and/or speed adjustments) to the vehicles to create the platoon formation. In another example, the driver or passenger of a vehicle may request to join an existing platoon, and in response, the server 125 may send driving commands to cause the vehicle to join the platoon, and subsequently to maintain the platoon formation. In another example, the platoons may be formed before driving the route according to a specific purpose. The platoon may be made up of a series of cargo trucks such as package or parcel delivery. The platoon may be made up of mass transit vehicles holding many passengers. The platoon may be touring vehicles (e.g., sightseeing or safari). The platoon may be made of vehicles from the same or associated manufacturers being delivered to a dealership. In another example, the vehicles may be eligible to form the platoon only when they are from the same manufacturer or use the same navigation device.

The lead vehicle may be defined in a variety of techniques. In one example, the lead vehicle is the only vehicle in the platoon that communicates with the server 125. For example, only the lead vehicle is configured for communication with the server 125 and/or for sending the location data to the server 125. In another example, more than just the lead vehicle is configured for communication with the server 125 but the lead vehicle identifies itself in the communication. For example, a message including the location data may include a lead vehicle identifier (e.g., an alphanumeric value in a vehicle identifier field or a flag) that identifies the sender of the message as the lead vehicle. In another example, the server 215 may ping the lead vehicle based on a particular IP (internet protocol) address or vehicle communication address. That is, the server 215 may request location data from only lead vehicles.

The server 125 is configured to analyze the location data to map match the location data to geographic data from the geographic database 123. The platoon controller 121 may query the database 123 for the road network. The platoon controller 121 may access a geographic region based on the location data as a rough estimate. The platoon controller 121 may more precisely match the location data to a particular roadway or road segment by comparing the location data to the data from the database 123. Such map matching may include identifying the closest road segment to the location data. For example, the platoon controller 121 may calculate a perpendicular distance to multiple road segments. The perpendicular distance to a road segment may be the length of a line that intersects the geographic point of the location data received from one or more vehicles 124 and connects to the road segment and meets the road segment at a right angle. The platoon controller 121 may calculate the perpendicular distance for each of a set of potential road segments and select the closest road segment to map match the location data to that road segment.

Subsequent to or in response to map matching the location data to the road segment, the platoon controller 121 identifies an upcoming intersection for the road segment matched to the location data. The platoon controller 121 may identify the direction of the vehicle, which may be from additional heading data collected at the vehicle from a compass or another sensor, or from a series of location data values. The upcoming intersection may be the next intersection in the direction of travel of the vehicle 124. The upcoming intersection may correspond to the node at the end of the road segment. In another example, the intersection may be identified from the route data. In this case, the upcoming intersection may not connect to or be associated with the matched road segment.

The platoon controller 121 determines a time period for the intersection. The time period may indicate the amount of time until an estimated change of state in the intersection. The change of state may be indicative of the ability of the platoon to traverse the intersection. In signalized intersections, the time period may indicate a time to a particular phase of the signal, in which the phases are red, yellow, and green in many areas, and the change of state may be the change from one phase to the next phase. In a highway ramp intersection, the time period may indicate the amount of time until traffic on the highway ramp frees up enough space for the platoon. In a stop intersection, the time period may indicate a time when the stop intersection is free from other vehicles that would interrupt the flow of vehicles through the intersection.

The platoon controller 121 calculates a distance to the intersection for a second vehicle of the platoon of vehicles. The platoon controller 121 may subtract the coordinate of the intersection with the coordinate in the road segment. The platoon controller 121 identifies the speed of the platoon or the vehicle. The platoon controller 121 calculates a travel time based on the distance to the intersection. The travel time may be computed by dividing the distance to the intersection by the speed of the vehicle.

The speed may be measured from a series of location data values. The speed may be the speed that the vehicle 124 has been set to travel. The speed may be estimated from one or more attributes of the road segment such as the average speed traveled on the road segment or the speed limit of the road segment. Different levels of granularity or accuracy may be used for different types of intersections. For example, in signalized intersections, a high degree of accuracy is required to time the changing of the phase, which may require the actual speed of the vehicles, and may require updating the speed value often. In a highway ramp, only a low degree of accuracy may be required to estimate the traffic back up on the ramp.

The platoon controller 121 calculates performs a comparison of the time period for the intersection to the travel time for the platoon of vehicles. The comparison may determine whether the time period for the intersection is the same or within a predetermined range of the travel time for the platoon of vehicles. The predetermined range may be a time value such as 0.5 seconds, 1 second, or 2 seconds. The predetermined range may be a proportion such as $\frac{1}{10}$ or 5% of the time period for the intersection or the travel time for the platoon of vehicles. The comparison may determine which is greater the time period for the intersection or the travel time for the platoon of vehicles. When the travel time for the platoon of vehicles is greater that the time period for the intersection, this indicates that the platoon of vehicles will not reach the intersection before the change in state of the intersection. When the travel time for the platoon of vehicles is less that the time period for the intersection, this indicates that the platoon of vehicles will arrive at the intersection before the change of state in the intersection.

The platoon controller 121 generates a platoon command in response to the comparison. The platoon command may instruct the platoon in response to comparison of the time period for the intersection and the travel time for the platoon of vehicles. The platoon command may instruct the platoon to speed up, for example, when the time period for the intersection is less than the travel time for the platoon of vehicles. The platoon command may instruct the platoon to slow down, for example, when the time period for the intersection is greater than the travel time for the platoon of vehicles. The platoon command may include a formation or pattern for the platoon to traverse the intersection. In addition and/or in the alternative, the platoon controller 121 may generate an advisory message including the type of incoming intersection, the time to the intersection, and any navigation or control adjustments associated with the intersection.

Figure 1B:
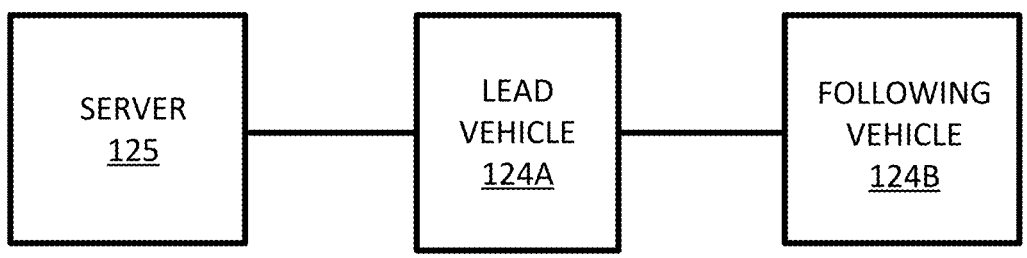
FIG. 1B illustrates a hierarchical chain of communication for an example system for controlling a platoon of vehicles.

FIG. 1B illustrates a hierarchical chain of communication for an example system for controlling a platoon of vehicles. The example of FIG. 1B includes the server 125, a lead vehicle 124A and a following vehicle 124B. There may be many following vehicles. The term "following" refers to the general pattern of the platoon in which one vehicle follows another vehicle. In other examples, these vehicles may be referred to as platoon vehicles, subservient vehicles, or member vehicles. In some examples, the server 125 communicates with all of the vehicles in the platoon including the lead vehicle 124A and the following vehicle 124B. In other examples, the server 125 only communicates with the lead vehicle 124A, which relays information to the following vehicles. Many other arrangements are possible.

Each of the following vehicles may take navigation and/or maneuver instructions from the lead vehicle 124A. Alternatively, each of the following vehicles may follow the vehicle directly in front of the respective following vehicle.

The platoon commands and platoon messages from the platoon controller 121 may be transmitted from the server 125 to the lead vehicle 124A. Alternatively, the platoon controller 121 may send the platoon commands and platoon messages directly to the following vehicles.

The platoon command may provide a navigation instruction that is applied by the vehicles or a driving instruction that is applied by the vehicles. The platoon command instructs the first vehicle to send a driving command to the second vehicle or another vehicle of the platoon of vehicles. The platoon command may be directly implemented by each vehicle. The platoon command may be interpreted by the vehicles, which generate the driving commands.

The navigation instruction may adjust the route. For example, the route may originally pass through one or more intersections that have unfavorable states at the time the route is traversed. The route may include a long wait at a traffic signal, congestion through an intersection, a blocked highway ramp, or an intersection that would likely interrupt the pattern of the platoon. The navigation instruction is an instruction to select a road segment not on the original route in order to reroute the vehicle, or the navigation instruction may adjust the destination or give the passenger the opportunity to adjust the destination. The navigation instruction may delay or speed up the time to reach the intersection in order to avoid the unfavorable state.

The driving instruction may cause the vehicles to adjust speed or apply a maneuver. Adjusting speed may include applying a brake or changing a throttle (e.g., accelerating or decelerating). The driving instruction may be selected to delay or speed up the time at which the vehicle will reach the intersection.

In some instances, the platoon command may instruct the vehicle to drive faster or slower. The vehicles may interpret the platoon command to slow down, for example, when the time period for the intersection is greater than the travel time for the platoon of vehicles. The vehicles may interpret the platoon command to speed up, for example, when the time period for the intersection is less than the travel time for the platoon of vehicles.

The driving instruction may include a maneuver. Example maneuvers include changing lanes. The platoon command may instruct the vehicles to change formation. Changing the formation may include changing the gap size between the vehicles. The platoon becomes smaller as the gap size is reduced. The gaps may be different sizes between different vehicles. Changing the formation may include change the number of rows or lanes that the platoon uses. For example, a single lane of 12 vehicles takes more time to traverse an intersection than three lanes of 4 vehicles.

Communication between the vehicles 124 and/or between the mobile device 122 and the server 125 through the network 127 may use a variety of types of wireless networks. Example wireless networks include cellular networks, the family of protocols known as WiFi or IEEE 802.11, the family of protocols known as Bluetooth, or another protocol. The cellular technologies may be analog advanced mobile phone system (AMPS), the global system for mobile communication (GSM), third generation partnership project (3GPP), code division multiple access (CDMA), personal handy-phone system (PHS), and 4G or long term evolution (LTE) standards, 5G, DSRC (dedicated short range communication), or another protocol.

Figure 2:
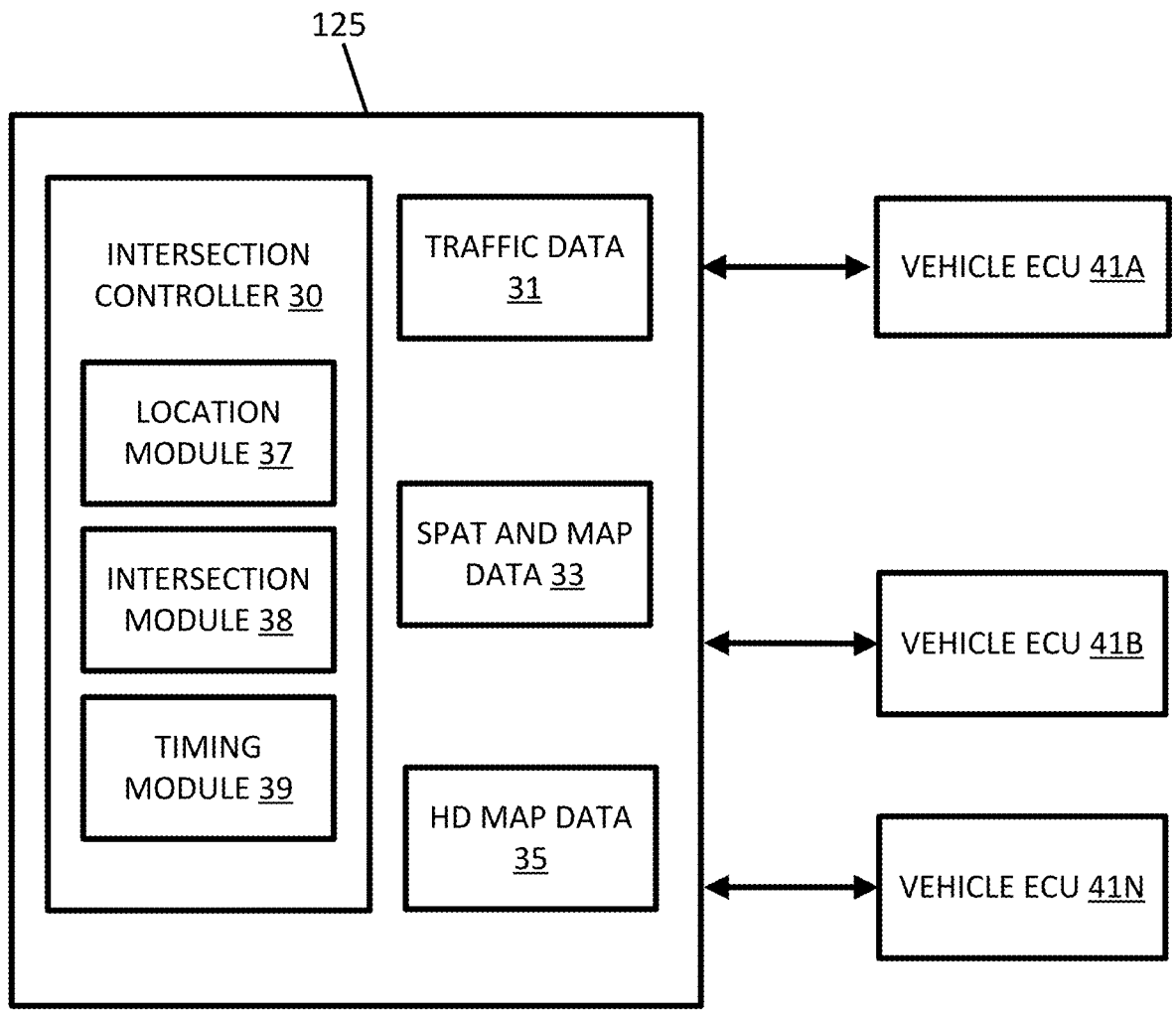
FIG. 2 illustrates an example system for controlling a platoon of vehicles directly from a central controller.

FIG. 2 illustrates an example system for controlling a platoon of vehicles directly from a central controller such as the intersection controller 30. The intersection controller 30 may communicate with one or more modules that receive, sort, and analyze different types of data from different sources. For example, the server 125 may include a traffic data module 31, a SPaT and MAP data module 33, and an HD map data module 35. The intersection controller 30 may include a location module 37, an intersection module 38, and a timing module 39. As discussed below, the intersection controller 30, through the location module, is configured to receive location data for at least a first vehicle of the platoon of vehicles. As discussed below, the intersection controller 30, the intersection module 38, is configured to match the location data for the vehicle to an intersection of the road network stored in the geographic database 123. As discussed below, the intersection controller 30, through the timing module, is configured to identify a time period for the intersection of the road network matched with the location data for the first vehicle.

Each of the modules may be implemented by a separate control circuit such as an integrated circuit. The intersection controller 30 may communication with each of the vehicle engine control units (ECU) 41A-N. The intersection controller 30 may perform any of the operations described with respect to platoon controller 121 herein.

Figure 3:
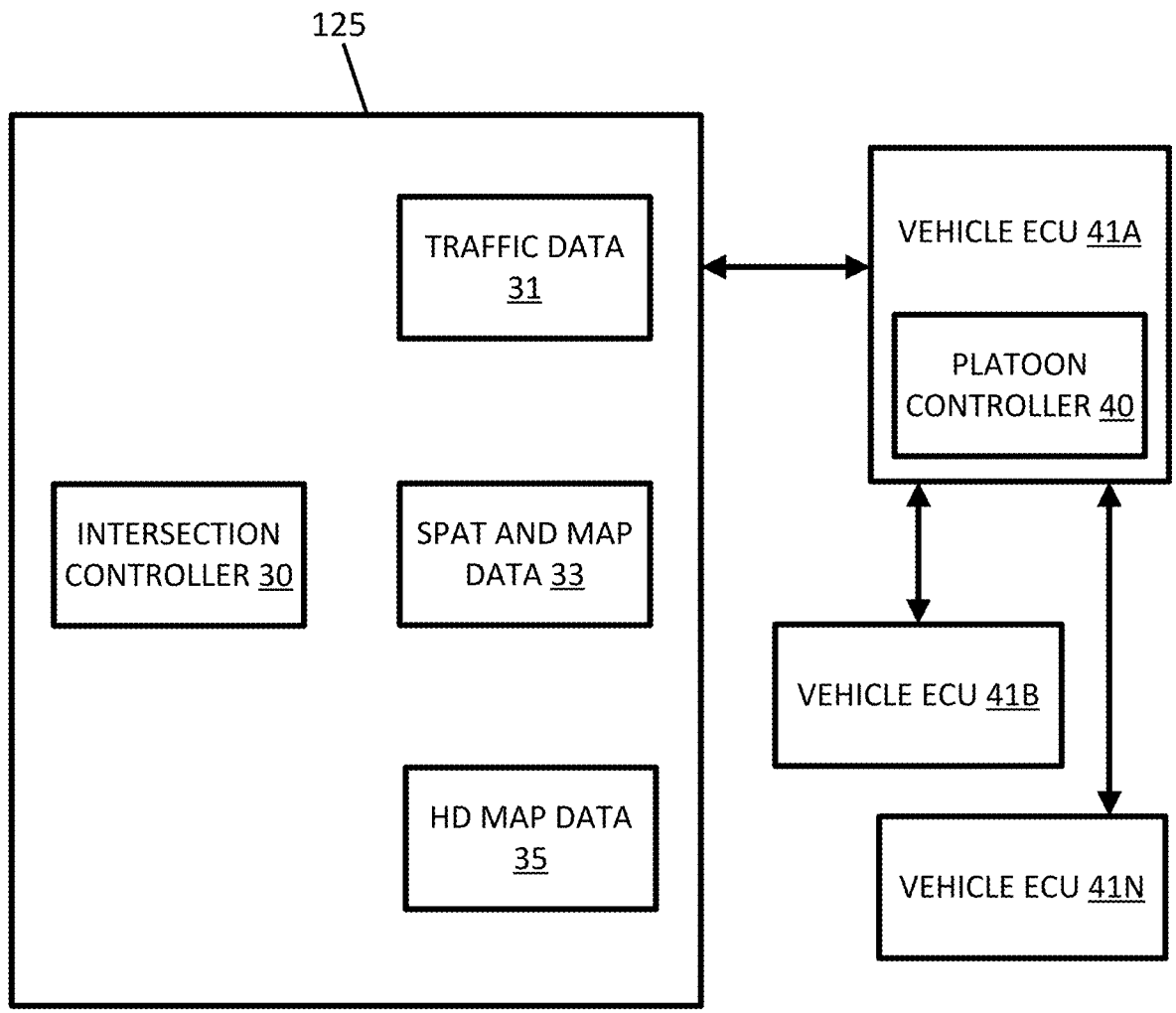
FIG. 3 illustrates an example system for controlling a platoon of vehicles through a lead vehicle.

FIG. 3 illustrates an example system for controlling a platoon of vehicles through a lead vehicle. The server 125 and the intersection controller 30 communication with the ECU 41A of the lead vehicle, which in turn issues commands to the other vehicle ECUs 41B-N using vehicle to vehicle (v2v) communication in order to broadcast the driving strategy. While driving on the road segment, the lead vehicle continuously or periodically receives the traffic data, incident data, HD map data, and SPaT data from the backend cloud system (e.g., server 125).

The engine control unit may be configured for other operation in the vehicle including coordination of starting the ignition, adjusting the throttle, receive commands from the user (e.g., steering, acceleration), monitoring the system of the vehicle, or other functions.

Figure 4:
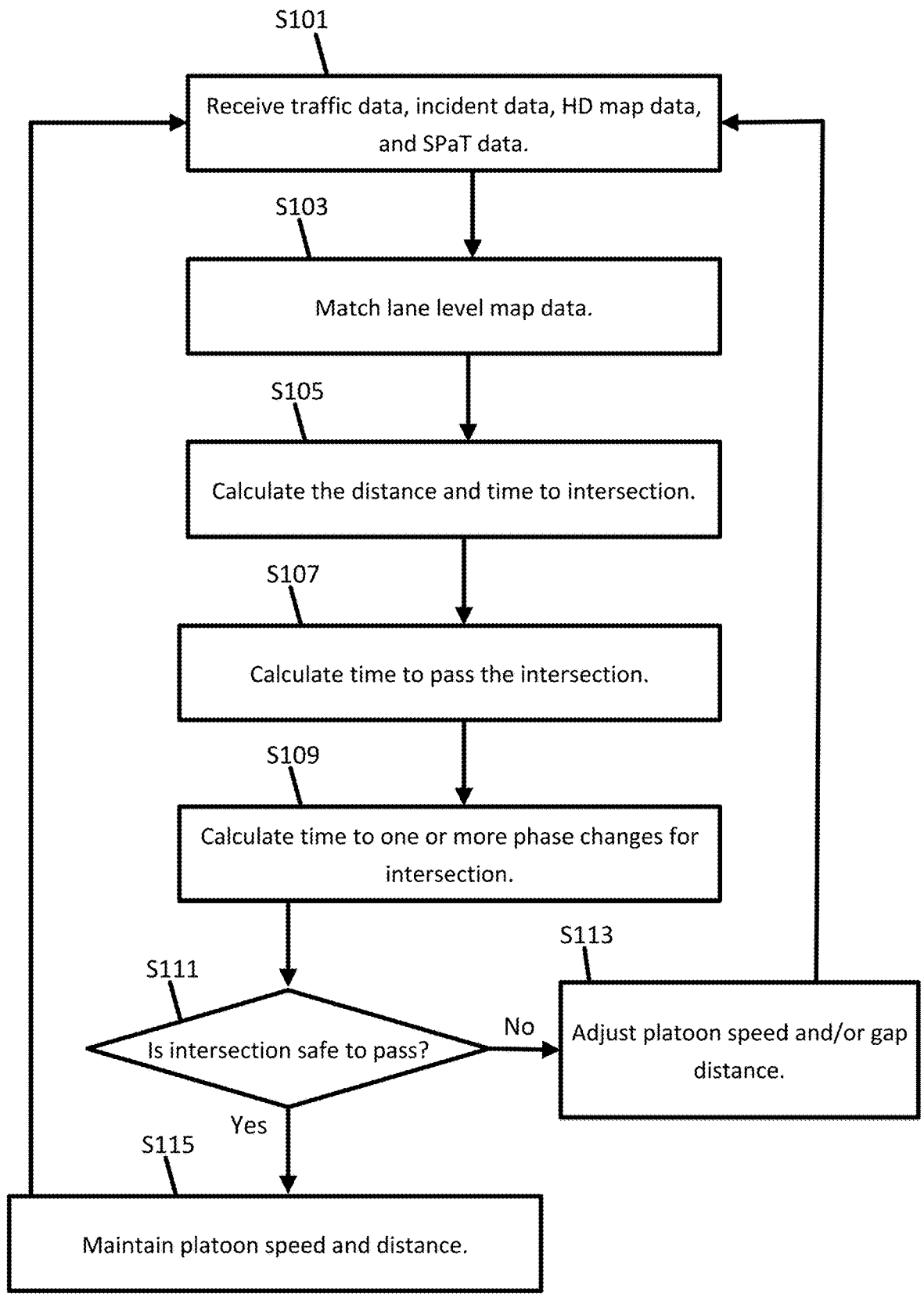
FIG. 4 illustrates an example flow chart for the system for controlling a platoon of vehicles.

FIG. 4 illustrates an example flow chart for the system for controlling a platoon of vehicles at a signalized intersection. The process may deviate depending on the type of intersection. At act S101, the intersection controller 30 or the traffic data module 31, the SPaT and MAP data module 33, and the HD map data module 35 receive traffic data, HD map data, and SPaT data. Incident data may also be included.

The traffic data module 31 may coordinate the exchange of information with a traffic service, which may be a traffic server configured to collect and distribute traffic data. The traffic data may be collected from multiple sources through observation or automatic sensors. For example, the sensor data for the traffic data may be collected by mobile devices and/or vehicles. The traffic data module 31 may organize and interpret the traffic data for the intersection controller 30. The traffic data module 31 may analyze the traffic data and identify portions of the traffic data that are relevant for a particular intersection or geographic region of intersections.

The traffic data module 31 or the intersection controller 30 may calculate the travel time to the intersection using the traffic data. The calculation of the travel time may be based on vehicles traveling the same road or roads to the intersection at the same time or recently. The traffic data module 31 or the intersection controller 30 may determine the state of the intersection based on the traffic data. The state of an intersection may be clear (e.g., traffic below a threshold) or congested (e.g., traffic above the threshold).

The traffic data module 31 or the intersection controller 30 may determine the state of the intersection based on the traffic state on one or more road segments connected to the intersection. The traffic states for road segments may include free flow (e.g., essentially no impacting traffic) and one or more levels of traffic based on the speed of the traffic. The traffic data module 31 or the intersection controller 30 may generate intersection state data based on the traffic states for associated road segments. When the traffic state for a predetermined number of road segments have a traffic level above a threshold, the traffic data module 31 or the intersection controller 30 may generate the intersection state data indicative of a congested intersection.

The traffic data module 31 or the intersection controller 30 may also receive incident data that describes incidents on the road segments. The incident data may be incorporated with traffic data, or the traffic data may reflect incidents, but in one example, the incident data separately describes incidents on the road segments. The incident data may include data indicative of a type of incident (e.g., accident, flood, construction, weather), a location of the incident (e.g., geographic coordinates, road segment, position along the road segment), and a temporal component (e.g., start time for the incident, end time for the incident, predicted duration for the incident).

The SPaT and MAP data module 33 coordinates the exchange of information with an intelligent transportation system (ITS), which may be an ITS server configured to collect and distribute data for intersections. In general, each traffic light in an intersection has an assigned SPaT control strategy. Such information about the intersection may be used by autonomous vehicles, navigation systems, traffic service providers and traffic management agencies to provide additional opportunities utilizing this information.

The Society of Automotive Engineers (SAE) J2735 standard for Dedicated Short Range Communications (DSRC) Message Set Dictionary defines a SPaT format that may be used to describe the current state of a traffic signal system for an intersection and the phases corresponding to the specific lanes in the intersection. This SPaT information may be delivered to a vehicle or navigation system through a DSRC or cellular network as the vehicle is approaching an intersection or is within a certain distance. This SPaT information may be delivered to the SPaT and MAP data module 33 of the server 125.

The MAP message provides intersection and roadway lane geometry data for one or more locations. The geometry data may include boundaries, dimensions, or other attributes that make up the intersections or roadways associated with the intersections. Additional roadway attributes for the intersection may be included for turn restrictions for particular lanes or what maneuvers are legally allowed at a given point may be included in the MAP message. For clarification, it should be pointed out that "MAP" may refer to the mapData from the ASN.1 definitions of SAE J2735, but other lane level geometry message may be used. This document uses capitalized "MAP" to refer to these data types and "map" for the road network type of maps.

MAP messages describe the lane level details of the intersection, while the SPAT message provides the state of one or more traffic signals associated with the intersection. A SPaT message may be linked to a MAP message using an identifier. The SPaT message may provide current data for the phase of the traffic signal. Possible phases for the traffic signal may include red, green, yellow (or orange), red arrow, green arrow, or a blinking variation thereof. The SPaT message may include a control signal sequence that predicts one or more subsequent phases of the traffic signal over a time period (e.g., 1 cycle, 5 minutes). The control signal sequence may include a phase and duration for multiple phases of the traffic signal in the order that the traffic signal cycles. For example, the SPaT message may include [green, 100; yellow, 4; red, 104] to indicate that the traffic signal is green for 100 time units, then yellow for four time units, and then red for 104 time units. The SPaT and MAP data module 33 may identify the control signal sequence from the SPaT message and identify the intersection from the MAP message. The SPaT message may include data for one intersection or for multiple intersection. The SPaT message may include data for all of the intersection within a predetermined area. The predetermined area may be a radius (e.g., 2 miles) of intersections from a requesting vehicle. The predetermined area may be a particular number of intersections or intersections with a distance in the electronic horizon of the requesting vehicle. The electronic horizon may be a set of road segments that the vehicle will travel according to a current route. The electronic horizon may be the set of road segments within a set distance that the vehicle could travel on (e.g., all possible upcoming routes for a set distance).

The HD map data module 35 may coordinate the exchange of information with the geographic database 123, which may be a cloud service (i.e., data stored at another location or with server 125). The HD map data module 35 may request map data from the geographic database 123 in response to the changing location of the mobile device 122 or the vehicle 124. The HD map data may be used to map match the location data to identify the one or more upcoming intersections.

At act S103, the intersection controller 30 matches the lane level map data with the location of the vehicle 124 or mobile device 122. The location data detected at the vehicle 124 is compared to the HD map data to determine the road segment and direction that the vehicle 124 is traveling. In addition, the map matching may include vehicle positions on road network with resolution of lane level (left turn lane, right turn lane, straight forward lane). The intersection controller 30 may also match the road segment to the MAP message to determine the geometry of characteristics of the intersection that correspond to the road segment and direction that the vehicle 124 is traveling. The intersection controller 30 may also match the road segment to the SPaT data to determine the control sequence for the intersection.

Figure 5:
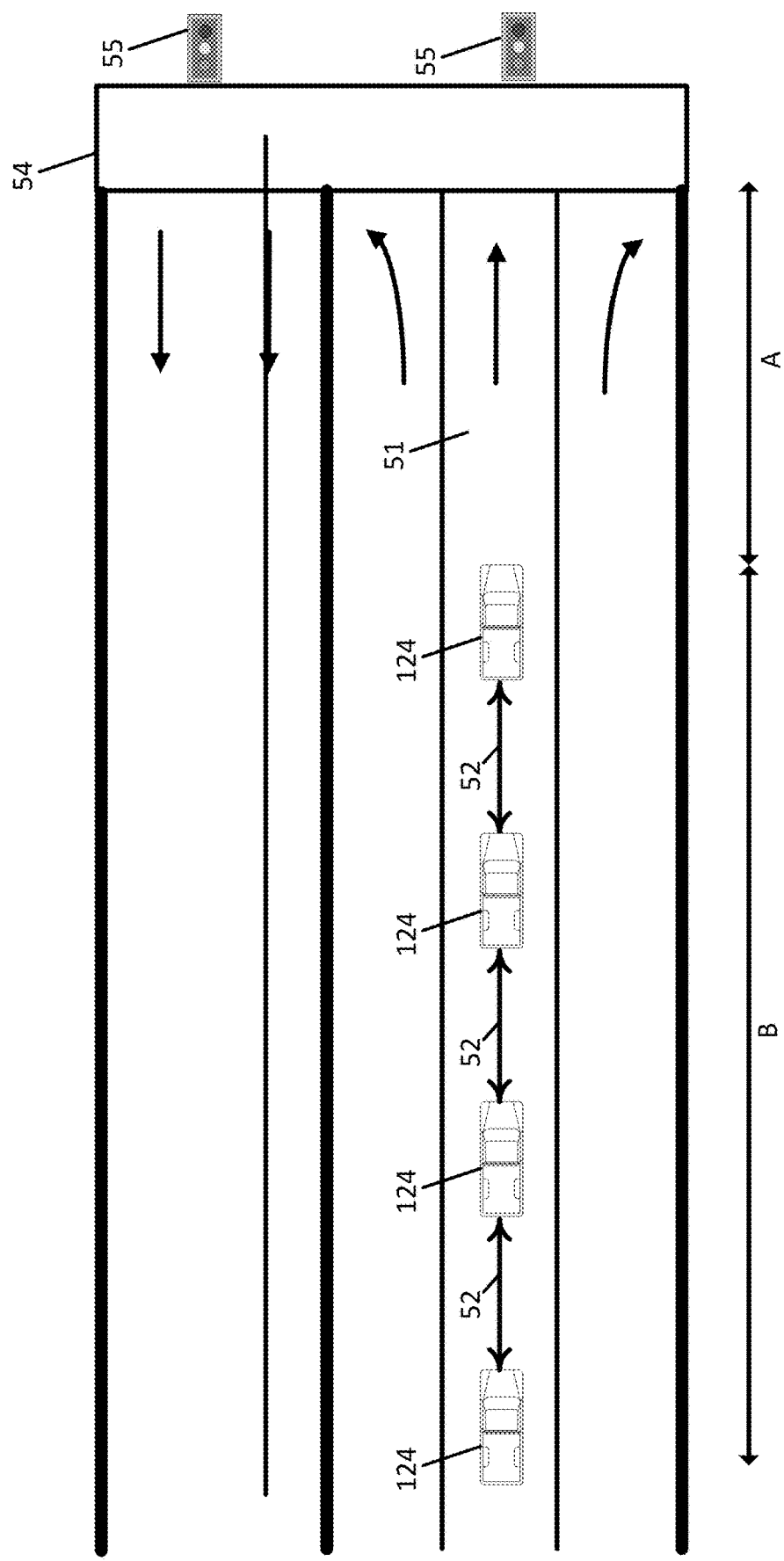
FIG. 5 illustrates an example intersection with a signal.

FIG. 5 illustrates an example intersection with a signal. A platoon of vehicles 124 are spaced apart by a gap distance 52 and traveling in lane 51 as the vehicles 124 approach intersection 54 with one or more traffic signal 55.

At act S105, the intersection controller 30 may calculate the distance and time to intersection. The distance (e.g., distance A in FIG. 5) may be the arithmetic or geometric distance between the location data detected at the vehicle 124 and the geographic location of the intersection. The time to the intersection may be calculated by the current speed of the vehicle 124 or may be based on the traffic data.

At act S107, the intersection controller 30 may calculate a time to pass or reach the intersection. The time to pass the intersection may be based on the length of the platoon (e.g., distance B in FIG. 5) or the time to intersection for the last vehicle in the platoon. The time to pass or reach the intersection may be based on the time when the last vehicle in the platoon passes or reaches the intersection. The intersection controller 30 may calculate a platoon length based on a quantity of vehicles in the platoon, one or more vehicles lengths, a quantity of gaps between vehicles, and one or more gap distances. The length of the platoon may be calculated for a single lane platoon having n vehicles spaced at uniform gap distances according to Equation 1:

$$\text{Platoon length} = (n * \text{vehicle length} + (n-1) * \text{gap distance})  \quad \text{Eq. 1}$$

Equation 1 may be modified for different types of platoons. For example, if the gap distances between vehicles is variable, another term is added to Eq. 1. If the platoon travels in multiple rows or lanes at a time, another term that divides by the number of lanes, or otherwise reduces the platoon length, is added to the Eq. 1. If the vehicles have different lengths, the vehicle length term is adjusted.

Then, to calculate time to pass the intersection, the intersection controller 30 may calculate the travel time for the last vehicle to pass the intersection based on the platoon length and a platoon speed. For example, the intersection controller 30 may calculate the time (t_pass) for the platoon to pass the intersection using Equation 2.

$$t_{pass} = \frac{\text{platoon length}}{\text{platoon speed}} \quad \text{Eq. 2}$$

At act S109, the intersection controller 30 calculate time to one or more phase changes for intersection. Using the control sequence determined in S103, intersection controller 30 identifies each of the phases for the intersection and compares one or more of the phases to the time to pass the intersection. In one example, the intersection controller 30 calculate the time to pass a set of phases from the control sequence. The set of phases may be t_green, t_yellow, t_red to represent the green, yellow, and red cycle time till the next phase change when the vehicle platoon system arrives at the signalized intersections. The intersection controller 30, through the timing module 39, may calculate a green phase time, a yellow phase time, or a red phase time as the time period for the intersection, wherein the comparison compares the travel time to the green phase time, the yellow phase time, or the red phase time.

At act S111, the intersection controller 30 determines whether the intersection can be passed by the platoon without interrupting the formation of the platoon or the efficient traveling. While this is illustrated with the phrase, "Is intersection safe to pass?," it should be noted that in addition to the safety of the passengers, the vehicles of the platoon, pedestrians, and the other vehicles of the intersection, this act also refers to whether the intersection can be traversed without changing the operation of the platoon (i.e., is there enough time to pass the intersection without adjusting the platoon).

As described above, the intersection controller 30 receives signal phase data for the intersection, wherein the intersection is a signalized intersection and the time period is determined based on the signal phase data for the intersection. The intersection controller 30 may make a series of comparisons to determine whether adjustments are need for the platoon to traverse the intersection. At act S113, the intersection controller 30 determines that there was not time to safely or efficiently pass the intersection and generates a command to adjust platoon speed and/or gap distance, which is sent to the lead vehicles to relay to the following vehicles or is sent directly to the following vehicles. At act S115, the intersection controller 30 determines that there is already time to safely or efficiently pass the intersection and in response, does nothing. Alternatively, the intersection controller 30 may generate a command to maintain platoon speed and distance, which is sent to the lead vehicles to relay to the following vehicles or is sent directly to the following vehicles.

Many specific examples are possible when determining whether the platoon of vehicles can safely or efficiently pass the intersection. The intersection controller 30 may compare t_pass to t_yellow or t_green. If t_yellow or t_green is less than t_pass, and if the traffic data indicates that the road traffic condition ahead is free flow, and instruct the lead vehicle in the vehicle platoon system notifies other vehicles that the vehicle platoon system will accelerate and drive through the intersections. Alternatively, the intersection controller 30 may notify the other vehicles directly.

If the traffic data indicates that the road traffic condition is greater than a threshold, the lead vehicle in the vehicle platoon system notifies other vehicles that the vehicle platoon system will deaccelerate and wait at the intersection till the next green phase comes. Alternatively, the intersection controller 30 may notify the other vehicles directly.

If t_yellow or t_green is not less than t_pass, the intersection controller 30 will instruct the lead vehicle in the vehicle platoon system to notify the other vehicles that the vehicle platoon system will maintain the current speed and gap distance to safely drive through the signalized intersections. Alternatively, the intersection controller 30 may notify the other vehicles directly.

The intersection controller 30 also compares t_pass to t_red. If the comparison indicates that part of the vehicle platoon will reach the intersection at t_red, the intersection controller 30, instructs the lead vehicle in the vehicle platoon system to continue notifying other vehicles the time that the vehicle platoon system will stop at the signalized intersections. Alternatively, the intersection controller 30 may notify the other vehicles directly.

Figure 6:
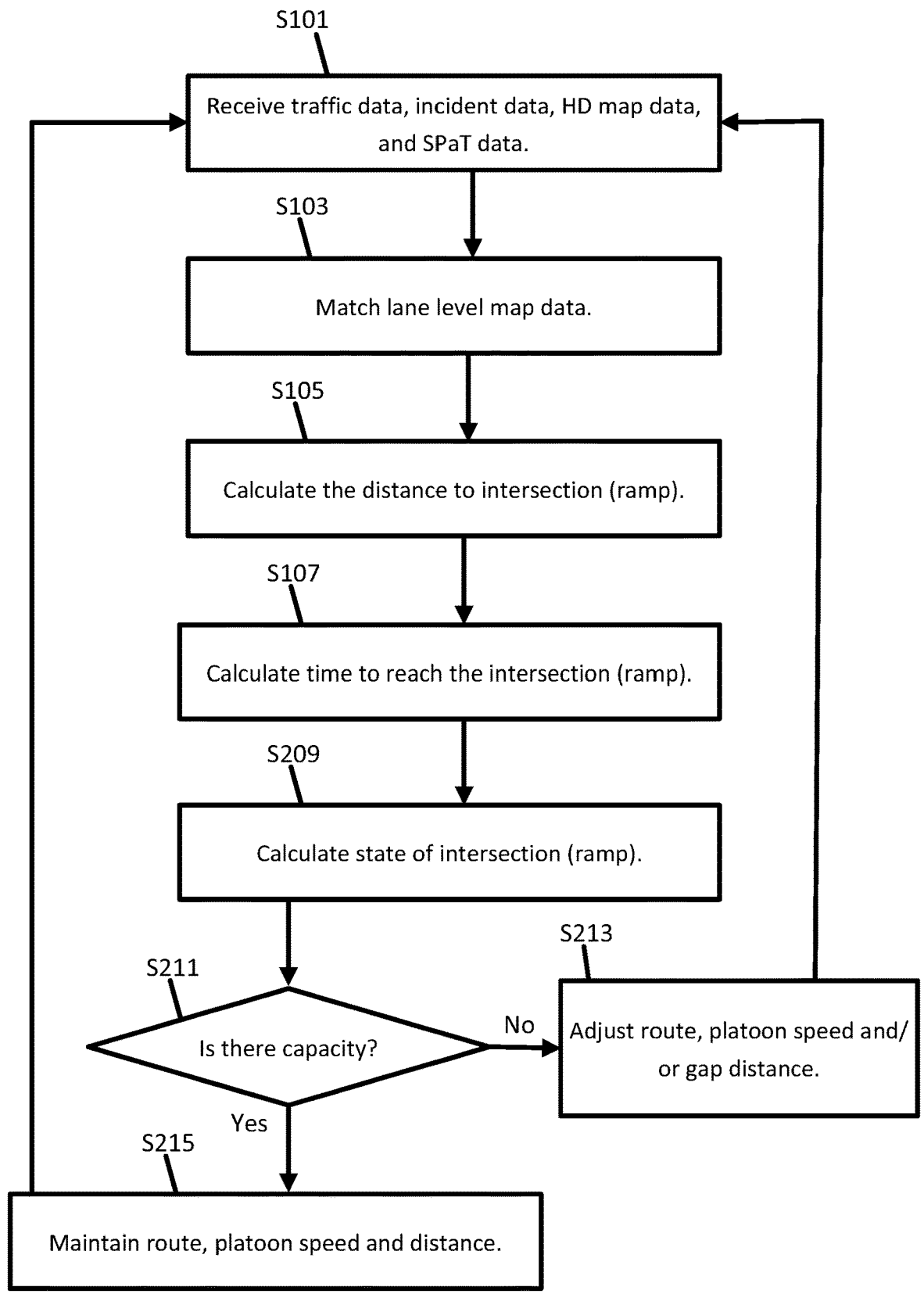
FIG. 6 illustrates an example flow chart for the system for controlling a platoon of vehicles.
Figure 7:
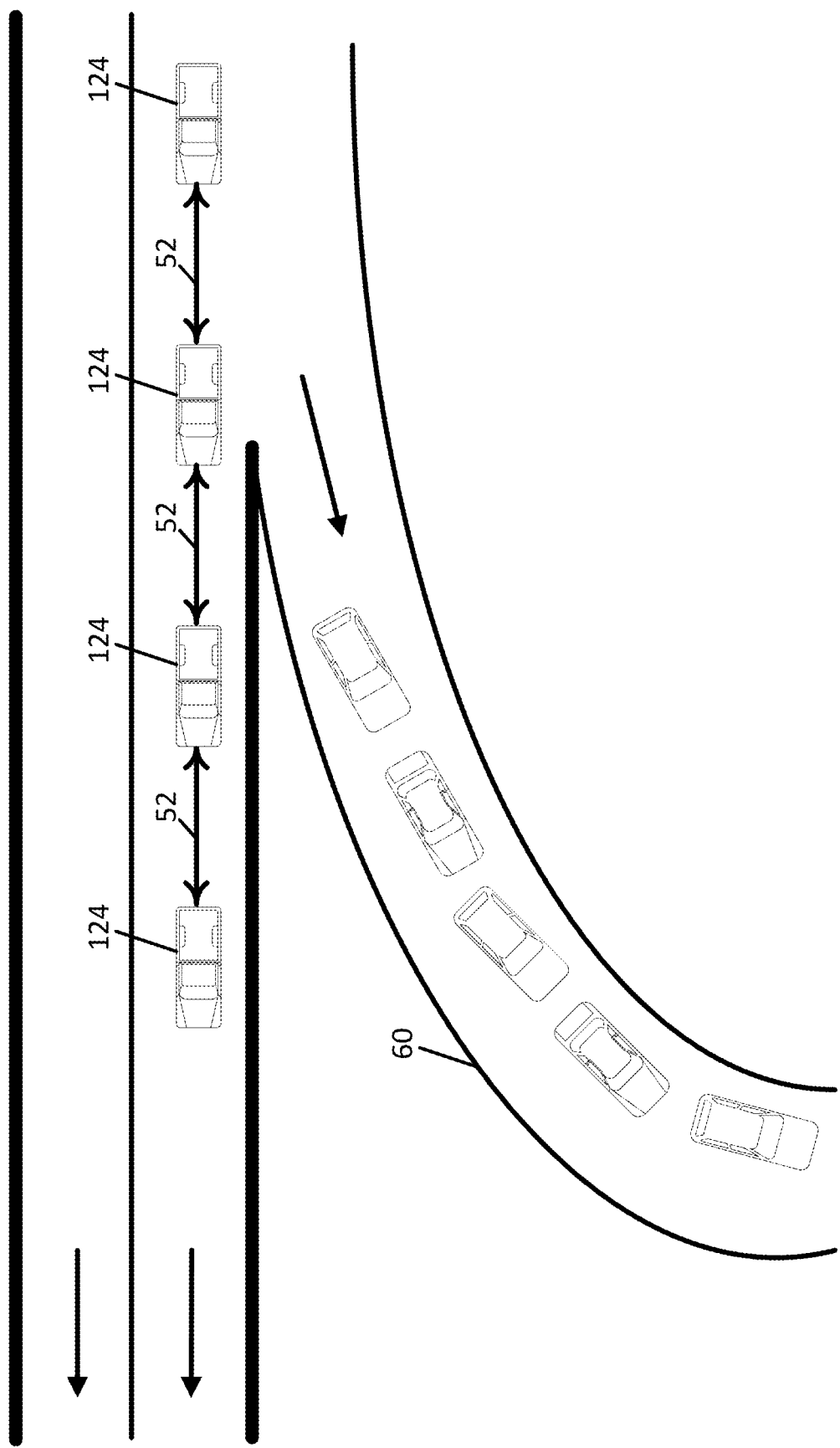
FIG. 7 illustrates an example intersection with a ramp.

FIG. 6 illustrates an example flowchart for the system for controlling a platoon of vehicles at a ramp. FIG. 7 illustrates an example intersection with a ramp 60 connecting two roadways. The ramp may connect a major artery (e.g., highway, interstate, freeway) to a collector road or a minor road. The ramp 60 may be an off ramp that gradually veers from the major artery to the minor road, which may be perpendicular to the major artery. Congestion on the ramp 60 may be subject to a traffic signal or a stop sign with the minor road. In addition, congestion on the minor road may easily back up to the major road.

The intersection as described herein may be the intersection of ramp 60 with the major road or may be the intersection of the ramp 60 with the minor road. In comparison to FIG. 4 for the flow chart for the system for controlling the platoon of vehicles, of when the intersection is ramp 60, acts S101-S107 may be performed in the same or similar ways described above. For example, at act S101 traffic data includes dynamic traffic information on ramp entrance and exit, and at act S105 the vehicle platoon system speed and the distance to ramp entrance or exit is determined However, for ramp 60 some of the acts may be modified. For example, in act S209 rather than phase changes for the intersection, the intersection controller 30 may determine whether the ramp 60 is passable for the platoon. In short, the ramp 60 may be considered passable for a platoon when there is space on the ramp 60 for the vehicles of the platoon at the time the platoon reaches the ramp 60. Please note that this could be determined by phase changes of a traffic signal on the minor road size of ramp 60. More than likely though, multiple factors may impact whether the ramp 60 is passable for the platoon. The factors may include the phases of the signal for the ramp 60, the traffic data for the congestion of the ramp 60, the size of the ramp 60, and local observations made for the ramp 60.

The intersection controller 30 may analyze traffic data for the ramp 60 to determine the amount of space that is likely present. That is, the intersection controller 30 may calculate, based on the traffic data, a time until the ramp includes space for the platoon of vehicles. An estimation may be made from historical correlations between traffic levels and capacity on the ramp 60. The traffic data, for example as received in S101, may include a traffic level (e.g., low, medium, high, or additional levels), and the intersection controller 30 that associates traffic levels with an estimated number of vehicles that can additionally fit on the ramp 60. The intersection controller 30 may compare these values for the estimated traffic at the time the platoon will reach the ramp 60, as determined by S107.

In act S211, the intersection controller 30 compares the number of vehicles of the platoon to the capacity of the ramp. When the capacity is greater than the number of vehicles of the platoon, the intersection controller 30 proceeds to act S215, and the route of the platoon is maintained, the speed of the platoon is maintained, and/or the gap distance of the platoon is maintained. When the capacity is less than the number of vehicles of the platoon, the intersection controller 30 proceeds to act S213, and one or more corrections may be made. The correction may be to adjust the route. When the platoon cannot fit in a ramp, the intersection controller 30 reroutes the platoon to find another ramp with enough capacity. The new route may be generated using the subsequent exit from the major road as the origin and the original destination. The correction may be to speed up the platoon to reach the ramp before congestion causes the capacity of the ramp to be too low. The correction may be to slow down the platoon to give time for the traffic to clear and the capacity of the ramp to increase.

In one example, the intersection controller 30 may cause the platoon to change formation to a pattern that will fit in the available capacity of the ramp. The pattern change may modify a single line platoon to have two or more parallel lines, which may allow the platoon to fit on the ramp. The intersection controller 30 may reduce the gap distance between vehicles on the ramp to increase capacity.

In another example, the lead vehicle may make observations using one or more sensors to determine whether the ramp has capacity for the platoon. A sensor such as a camera, a light detection and ranging (LiDAR) device, or a radar device may collect measurements of the state of the ramp 60. When the sensor data indicates that there is capacity on the ramp 60, the intersection controller 30 proceeds to act S215, and the route of the platoon is maintained, the speed of the platoon is maintained, and/or the gap distance of the platoon is maintained to continue as planned to ramp 60. When the capacity is less than the number of vehicles of the platoon, the intersection controller 30 proceeds to act S213, and an adjustment is made to the route, or the platoon is adjusted to allow time for the state of the ramp 60 to change.

Figure 8:
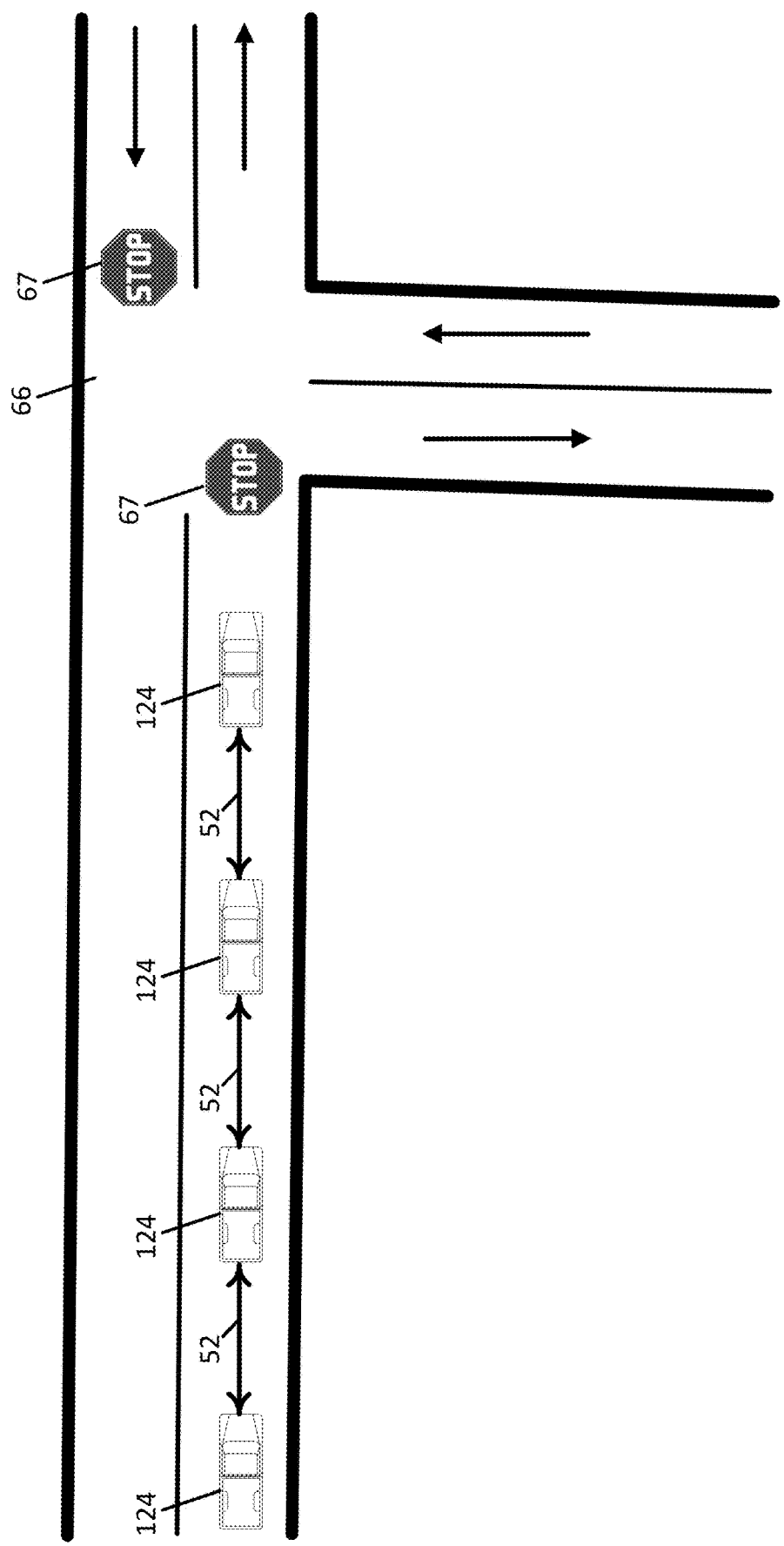
FIG. 8 illustrates an example intersection with a stop sign.

FIG. 8 illustrates an example intersection 66 with one or more stop signs 67. In comparison to FIG. 4 for the flow chart for the system for controlling the platoon of vehicles, of when the intersection is ramp 60, acts S101-S105 may be performed in the same or similar ways described above. The intersection controller 30 may calculate the time required to pass the intersection based on the number of vehicles in the platoon and the spacing between the vehicles. The intersection controller 30 may identify a size for the platoon of vehicles and calculate, based on the size of the platoon of vehicles, a time until the platoon of vehicles arrives at the stop intersection. In response to the time falling below a threshold, the intersection controller 30 may generate messages to the vehicles in the vicinity of the stop intersection. The lead vehicle in the vehicle platoon system may broadcast to nearby vehicles a message to warn the vehicle platoon system will arrive to the stop sign soon. The message may include the time required to pass the intersection with the stop sign. The messaged may be transmitted to nearby vehicles using DSRC, Bluetooth, or another wireless technique. The platoon of vehicles stops at the stop sign 67. The lead vehicle may pause to allow the gap distance between vehicles to close.

The vehicle platoon crosses the intersection 66 together as a group without any dissociation. In one example, the lead vehicle may wait for confirmation (e.g., receipt of a confirmation message) from the intersection controller 30 or a predetermined number of nearby vehicles before leading the vehicle platoon across the intersection 66 without any disconnection of the platoon of vehicles. This prevents the platoon of vehicles from being separated by other vehicles entering the intersection. It also improves the speed of traffic flow because multiple stops need not be made by the platoon of vehicles.

Figure 9:
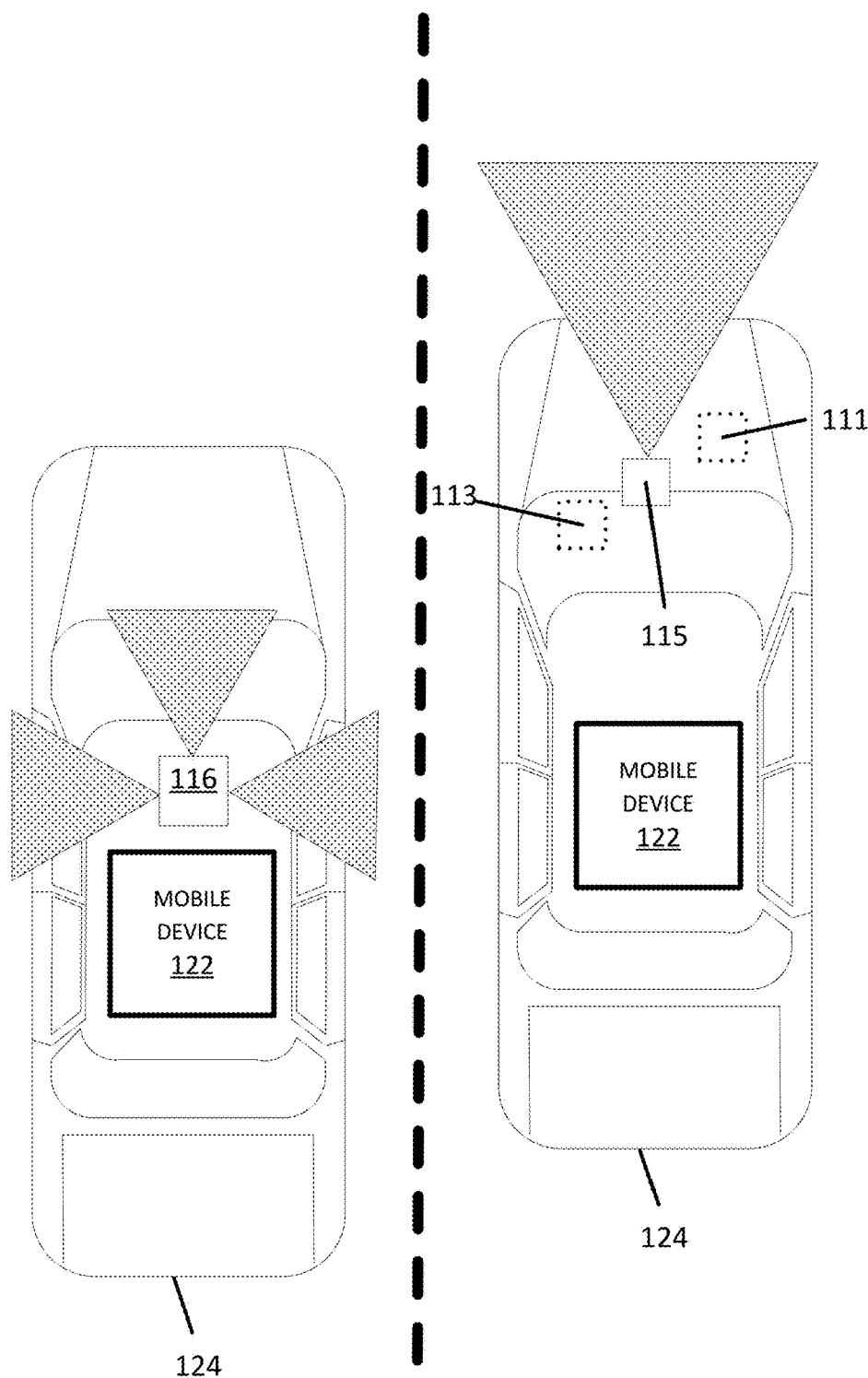
FIG. 9 illustrates an exemplary vehicle of the systems of FIGS. 1-8.

FIG. 9 illustrates an exemplary vehicle 124 of the systems of FIGS. 1-8. One of the vehicles 124 may be a collection vehicle configured to collect data in the area proximate to the vehicle 124. The collection vehicle may include one or more distance data collection device or sensor, such as a light detection and ranging (LiDAR) device. The distance data collection sensor may generate point cloud data. The distance data collection sensor may include a laser range finder that rotates a mirror directing a laser to the surroundings or vicinity of the collection vehicle on a roadway or another collection device on any type of pathway. Other types of pathways may be substituted for the roadway in any embodiment described herein.

A connected vehicle includes a communication device and an environment sensor array for reporting the surroundings of the vehicle 124 to the server 125. The connected vehicle may include an integrated communication device coupled with an in-dash navigation system. The connected vehicle may include an ad-hoc communication device such as a mobile device 122 or smartphone in communication with a vehicle system. The communication device connects the vehicle to a network including at least one other vehicle and at least one server. The network may be the Internet or connected to the internet.

The sensor array may include one or more sensors configured to detect surroundings of the vehicle 124. The sensor array may include multiple sensors. Example sensors include an optical distance system such as LiDAR 116, an image capture system 115 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera or another camera.

The vehicles 124 may include a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the vehicle 124. The positioning system may also include a receiver and correlation chip to obtain a GPS signal. Alternatively or additionally, the one or more detectors or sensors may include an accelerometer built or embedded into or within the interior of the vehicle 124.

In some alternatives, additional sensors may be included in the vehicle 124. An engine sensor 111 may include a throttle sensor that measures a position of a throttle of the engine or a position of an accelerator pedal, a brake senor that measures a position of a braking mechanism or a brake pedal, or a speed sensor that measures a speed of the engine or a speed of the vehicle wheels. Another additional example, vehicle sensor 113, may include a steering wheel angle sensor, a speedometer sensor, or a tachometer sensor.

A mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle 124. The assisted driving device may include memory, a processor, and systems to communicate with the mobile device 122. The assisted driving vehicles may respond to geographic data received from geographic database 123 and the server 125 and driving commands or navigation commands received from the intersection controller 30 and/or platoon controller 40.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to geographic data received from geographic database 123 and the server 125 and driving commands or navigation commands received from the intersection controller 30 and/or platoon controller 40.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle, and may respond to geographic data received from geographic database 123 and the server 125 and driving commands or navigation commands received from the intersection controller 30 and/or platoon controller 40.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on to geographic data received from geographic database 123 and the server 125 and driving commands or navigation commands received from the intersection controller 30 and/or platoon controller 40.

Figure 10:
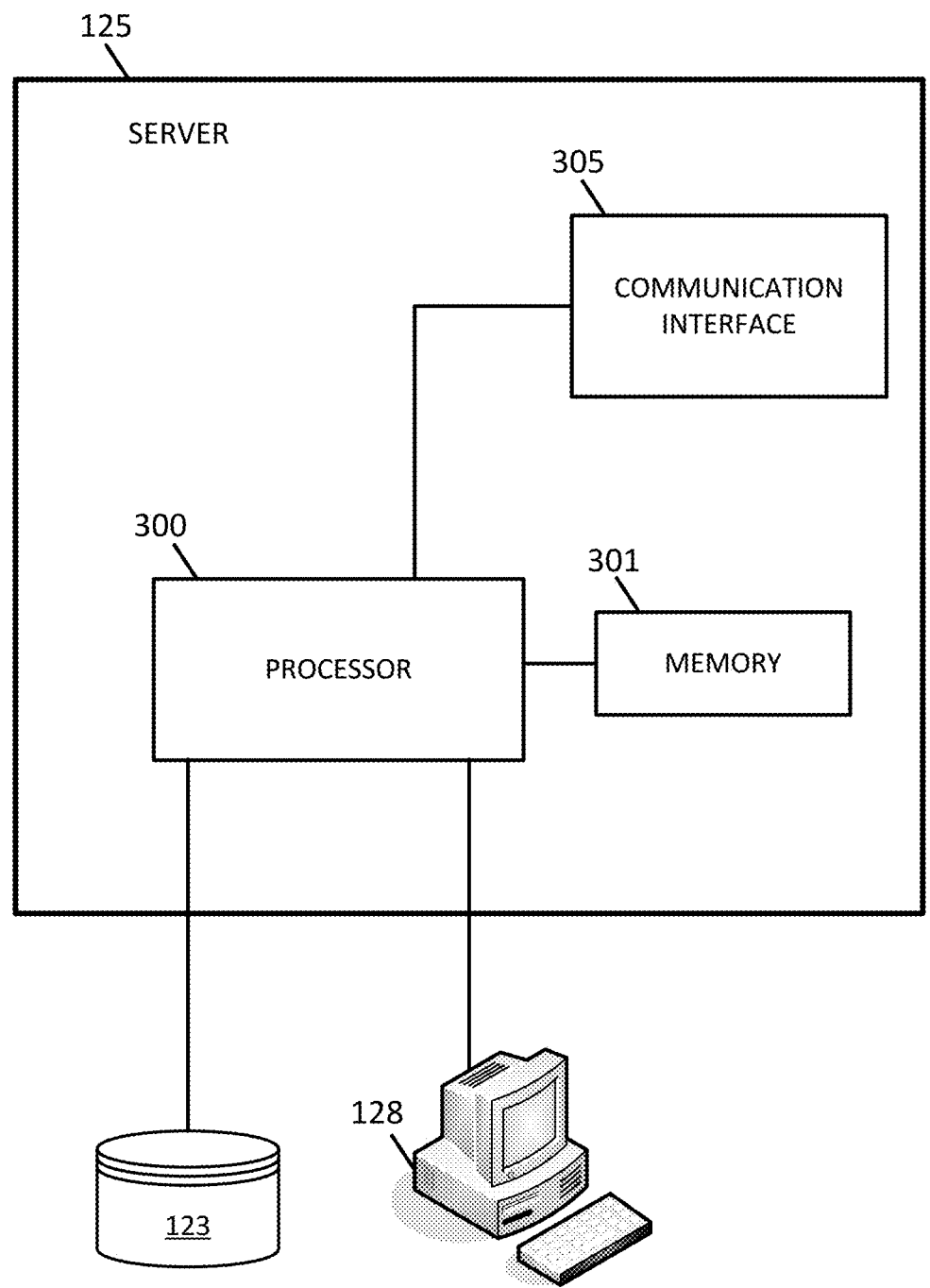
FIG. 10 illustrates an example server.
Figure 11:
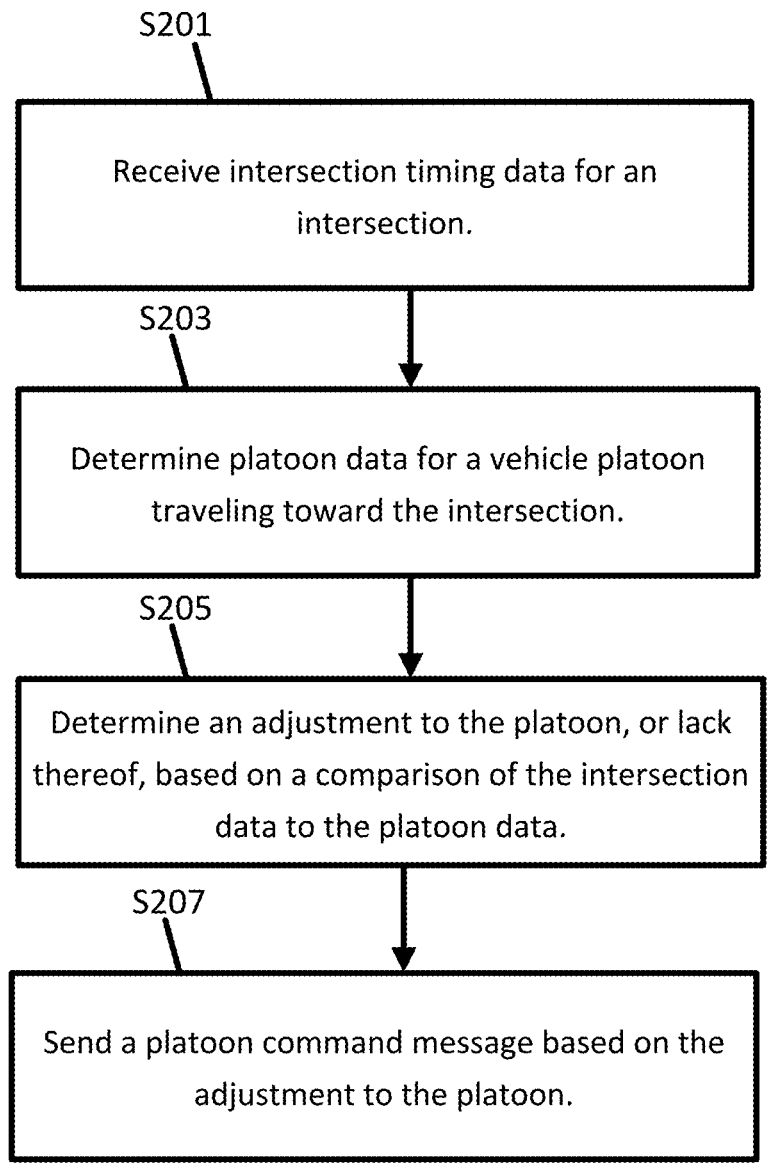
FIG. 11 illustrates an example flowchart for the server of FIG. 10.

FIG. 10 illustrates an example server 125, which may apply to the system of FIG. 1. The server 125 includes a processor 300, a communication interface 305, a memory 301, and a database 123. An input device (e.g., keyboard or personal computer 128) may be used to enter settings to the server 125. Additional, different, or fewer components may be provided in the server 125. FIG. 11 illustrates an example flowchart for the server of FIG. 10. Additional, different, or fewer acts may be provided.

At act S201, the processor 300 or communication interface 305 receives intersection timing data for an intersection. The intersection timing data includes data indicative of whether the intersection may be passed in a particular direction. The intersection timing data may relate to a traffic signal (i.e., when the traffic signal will be red or green) or the intersection timing data may relate to congestion at or near the intersection. The communication interface 305 may be means for receiving intersection timing data for an intersection. The processor 300 may include circuitry or a module or an application specific controller as a means for receiving intersection timing data for an intersection.

At act S203, the processor 300 determines platoon data for a vehicle platoon traveling toward the intersection. The platoon data includes data indicative of the position and/or speed of the vehicle platoon. The platoon data may indicate an estimate arrival time for the platoon at the intersection. The processor 300 may include circuitry or a module or an application specific controller as a means for calculating platoon data for the platoon.

At act S205, the processor 300 compares the intersection data to the platoon data to determine whether an adjustment to the platoon should be made. When the platoon data indicates that the platoon will arrive at the intersection before the time indicated in the intersection data that the intersection can be traversed by the platoon, the processor 300 determines that the platoon should be slowed. Adjustments to slow the platoon may include reducing the speed of the platoon, taking a detour (e.g., going around a block) along the route, or changing lanes to slower lane. When the platoon data indicates that the end of the platoon will arrive at the intersection too late for the entire platoon to traverse the intersection, the processor 300 determines that the platoon should be sped up. Adjustments to speed up the platoon may include increasing the speed of the platoon, reducing the gap distances between vehicles, or changing lanes to a quicker lane. Another adjustment to increase the speed may include changing the pattern of the platoon. The processor 300 may include circuitry or a module or an application specific controller as a means for determining an adjustment to the platoon.

At act S207, the processor 300 or communication interface 305 generates and sends a platoon command message based on the adjustment of act S205. The processor 300 may include circuitry or a module or an application specific controller as a means for generating the platoon command message. The communication interface 305 may be a means for sending the platoon command message to one or more vehicles. The processor 300 may wait for an acknowledgement message from the vehicle and send supplemental message until the acknowledgment message is received.

The memory 301 may be configured to store the intersection data and the platoon data. The memory 301 may store templated for the platoon commands and a lookup table for comparing the intersection data and the platoon data.

Figure 12:
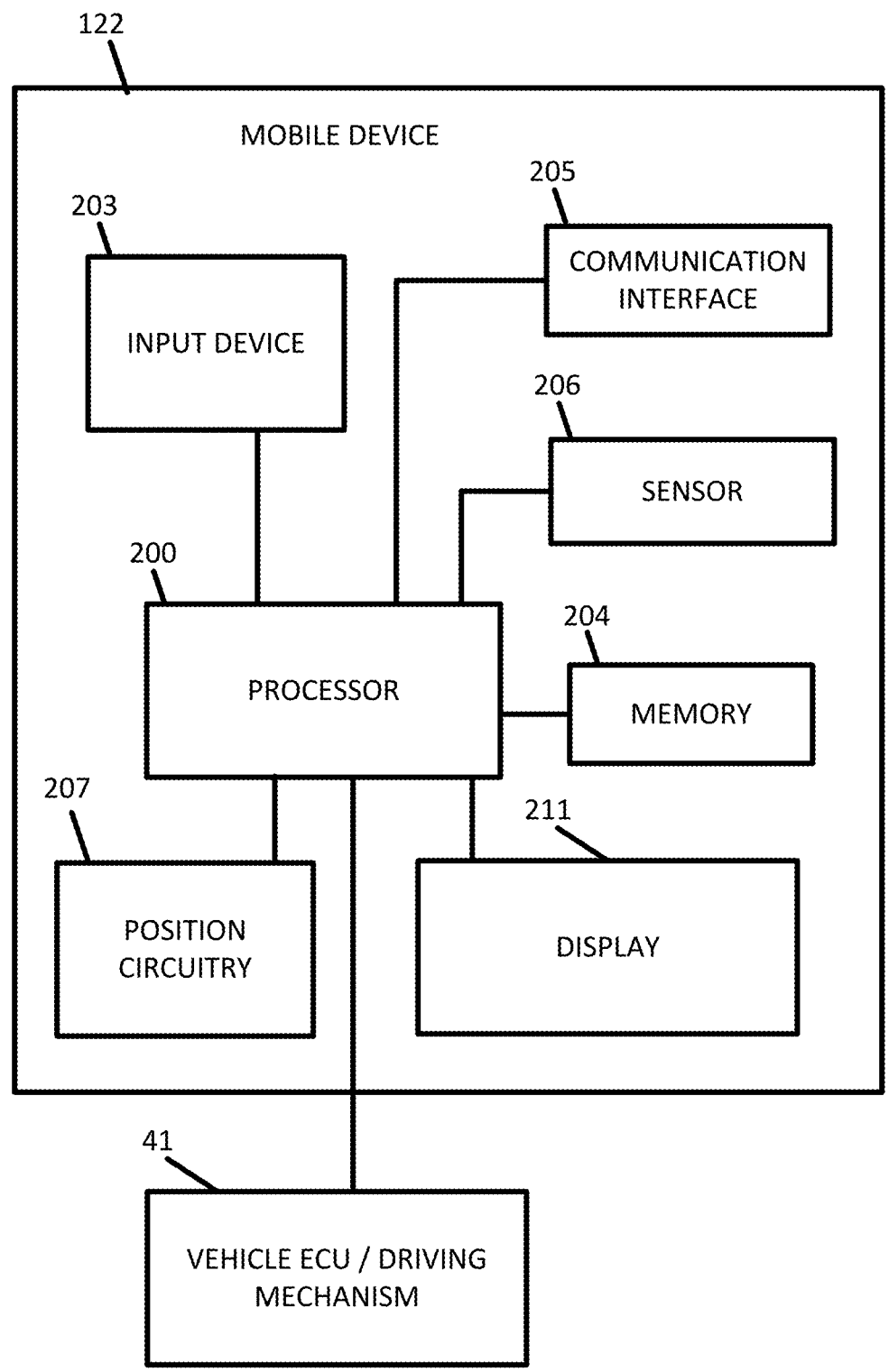
FIG. 12 illustrates an example mobile device.
Figure 13:
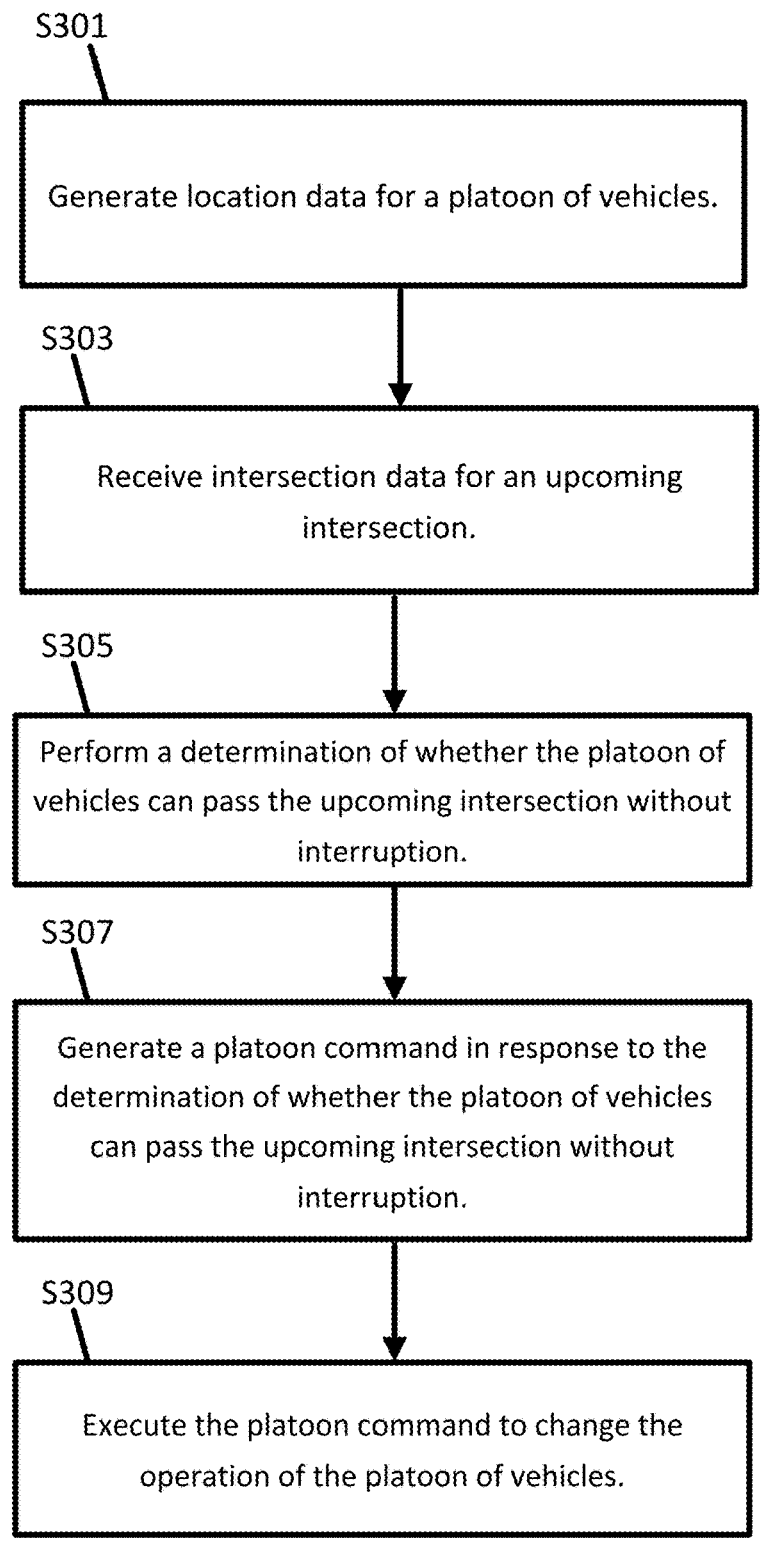
FIG. 13 illustrates an example flowchart for the mobile device of FIG. 12.

FIG. 12 illustrates an exemplary mobile device 122 of the system of FIG. 1. The mobile device 122 includes a processor 200, a memory 204, an input device 203, a communication interface 205, position circuitry 207, a distance detector 209, a display 211, and a sensor 206. The input device 203 may receive commands from the user for default settings for the platoon. The default settings may include the gap distance between vehicles, the pattern of the platoon, the types of intersections to analyze, the number of vehicles in the platoon, or other settings. The processor 200 may communicate with a vehicle ECU which operates one or more driving mechanisms (e.g., accelerator, brakes, steering device). Alternatively, the mobile device 122 may be the vehicle ECU, which operates the one or more driving mechanisms directly. The sensor 206 may include a camera, a LiDAR device, or another sensor described herein. The sensor 206 may detect congestion local to the mobile device 122. The sensor 206 may detect when an intersection is approaching. Additional, different, or fewer components are possible for the mobile device 122. FIG. 12 illustrates an example flowchart for the operation of mobile device 122. Additional, different, or fewer acts may be provided.

At act S301, the processor 200 generates, using position circuitry 207, location data for a platoon of vehicles. The position of the lead vehicle, or any of the following vehicles, may represent the location of the platoon. The position circuitry 207 or the processor 200 detects a geographic position of the mobile device 122 or the vehicle and may send the geographic location for the mobile device 122 to a server. The position circuitry 207 is one example means for detecting or determining a geographic position. The processor 200 may also include circuitry serving as means for detecting or determining a geographic position. The detected geographic position of the mobile device 122 may include a latitude and longitude pair. The geographic position may be detected or sampled at periodic intervals in time or distance, or may be continuously detected. The sensor 206, which may include distancing sensors, range sensor, image sensors, or another sensor as described with respect to FIG. 9 may also provide information for determining the geographic position of the mobile device 122.

At act S303, the processor 200 or the communication interface 205 receives, from the server, intersection data for an upcoming intersection, the intersection data indicative of a passable phase of the intersection. Passable phases for an intersection may include a green phase, or a green and yellow phase, for an intersection with a traffic signal. In other examples, the passable phase for an intersection may include an intersection with traffic congestion, or predicted traffic congestion, below a threshold level. The communication interface 205 is an example for a means for receiving the intersection data. The processor 200 may include circuitry or a module or an application specific controller as a means for receiving the intersection data.

At act S305, the processor 200 may perform a determination of whether the platoon of vehicles can pass the upcoming intersection without interruption. The platoon of vehicles can pass the upcoming intersection when the end of the platoon has time to pass in the passable phase of the intersection. As described in examples herein, the processor 200 may calculate an estimated time for the end of the platoon to reach the intersection and compare the estimated time to the ending of the passable phase of the intersection. The processor 200 may include circuitry or a module or an application specific controller as a means for determining whether the platoon of vehicles can pass the upcoming intersection without interruption.

At act S307, the processor 200 or the vehicle ECU 41 generates a platoon command in response to the determination of whether the platoon of vehicles can pass the upcoming intersection without interruption. The platoon command may change the route of the platoon, change the speed of the platoon, or change the lanes the platoon travels in (e.g., change the pattern of the platoon). The processor 200 or the ECU 41 may include circuitry or a module or an application specific controller as a means for generating a platoon command.

At act S309, the processor 200 or the ECU 41 may execute the platoon command. Alternatively, the processor 200 or the ECU 41 may instruct a driving mechanism to execute the platoon command. Example driving mechanisms include a throttle that speeds up or slows down the vehicle, a steering wheel that turns the vehicle in one or more directions, or a brake that slows the vehicle. The platoon command may be executed to decrease the speed of the platoon of vehicles with the determination of whether the platoon of vehicles can pass the upcoming intersection without interruption indicates that a lead vehicle reaches the intersection before the passable phase of the intersection. The platoon command may be executed to increase the speed of the platoon of vehicles with the determination of whether the platoon of vehicles can pass the upcoming intersection without interruption indicates that a following vehicles reaches the intersection after the passable phase of the intersection.

The processor 200 may include a routing module including an application specific module or processor that calculates routing between an origin and destination. The routing module is an example means for generating a routing command based on the platoon command. The routing command may be a route from the route to the destination. The routing command may be a driving instruction (e.g., turn left, go straight), which may be presented to a driver or passenger, or sent to an assisted driving system. The display 211 is an example means for displaying the routing command. The mobile device 122 may generate a routing instruction based on the platoon command. The routing instructions may be provided by display 211. The mobile device 122 may be configured to execute routing algorithms to determine an optimum route to travel along a road network from an origin location to a destination location in a geographic region. Using input(s) including map matching values from the server 125, a mobile device 122 examines potential routes between the origin location and the destination location to determine the optimum route. The mobile device 122, which may be referred to as a navigation device, may then provide the end user with information about the optimum route in the form of guidance that identifies the maneuvers required to be taken by the end user to travel from the origin to the destination location. Some mobile devices 122 show detailed maps on displays outlining the route, the types of maneuvers to be taken at various locations along the route, locations of certain types of features, and so on. Possible routes may be calculated based on a Dijkstra method, an A-star algorithm or search, and/or other route exploration or calculation algorithms that may be modified to take into consideration assigned cost values of the underlying road segments.

The mobile device 122 may plan a route through a road system, or modify a current route through a road system in response to the request for additional observations of the road object. For example, when the mobile device 122 determines that there are two or more alternatives for the optimum route and one of the routes passes the initial observation point, the mobile device 122 selects the alternative that passes the initial observation point. The mobile devices 122 may compare the optimal route to the closest route that passes the initial observation point. In response, the mobile device 122 may modify the optimal route to pass the initial observation point.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 801 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The databases 123 may include geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes.

The databases may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The databases may include historical traffic speed data for one or more road segments. The databases may also include traffic attributes for one or more road segments. A traffic attribute may indicate that a road segment has a high probability of traffic congestion.

The input device 203 may be one or more buttons, keypad, keyboard, mouse, stylus pen, trackball, rocker switch, touch pad, voice recognition circuit, or other device or component for inputting data to the mobile device 122. The input device 203 and display 211 may be combined as a touch screen, which may be capacitive or resistive. The display 211 may be a liquid crystal display (LCD) panel, light emitting diode (LED) screen, thin film transistor screen, or another type of display. The output interface of the display 211 may also include audio capabilities, or speakers. In an embodiment, the input device 203 may involve a device having velocity detecting abilities.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 207 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The following example embodiments of the invention are also disclosed:

Embodiment 1

A method for controlling a platoon of vehicles through an intersection, the method comprising:
- receiving location data for at least a first vehicle of the platoon of vehicles;
- map matching the location data for the first vehicle to a road network;
- identifying an intersection in the road network in response to the matched location data;
- determining a time period for the intersection;
- calculating, by a processor, a distance to the intersection for a second vehicle of the platoon of vehicles;
- calculating, by the processor, a travel time based on the distance to the intersection for the second vehicle of the platoon of vehicles;
- performing, by the processor, a comparison of the time period for the intersection to the travel time for the second vehicle; and
- generating, by the processor, a platoon command in response to the comparison.

Embodiment 2

The method of embodiment 1, further comprising:
- receiving signal phase data for the intersection, wherein the intersection is a signalized intersection and the time period is determined based on the signal phase data for the intersection.

Embodiment 3

The method of any of embodiments 1 and 2, wherein the signal phase data includes a signal phase and timing (SPaT) message.

Embodiment 4

The method of any of embodiments 1-3, further comprising:
- calculating a green phase time, a yellow phase time, or a red phase time as the time period for the intersection, wherein the comparison compares the travel time to the green phase time, the yellow phase time, or the red phase time.

Embodiment 5

The method of any of embodiments 1-4, further comprising:
- comparing the red phase time to the travel time of the second vehicle to determine whether the platoon of vehicles can pass the intersection without interruption.

Embodiment 6

The method of any of embodiments 1-5, wherein calculating the distance to the intersection for the second vehicle of the platoon of vehicles comprises:
- calculating a platoon length based on a quantity of vehicles in the plurality of vehicles, one or more vehicles lengths, a quantity of gaps between vehicles, and one or more gap distances; and
- calculating the travel time for the second vehicle based on the platoon length and a platoon speed.

Embodiment 7

The method of any of embodiments 1-6, wherein the platoon command instructs the first vehicle or the second vehicle to adjust speed.

Embodiment 8

The method of any of embodiments 1-7, wherein the platoon command instructs the first vehicle to send a driving command to the second vehicle or another vehicle of the platoon of vehicles.

Embodiment 9

The method of any of embodiments 1-8, wherein the platoon command instructs the first vehicle or the second vehicle to adjust one or more gaps between vehicles in the platoon of vehicles.

Embodiment 10

The method of any of embodiments 1-9, wherein the intersection is a ramp, wherein determining the time period for the intersection comprises:
- receiving traffic data for the ramp; and
- calculating, based on the traffic data, a time until the ramp includes space for the platoon of vehicles.

Embodiment 11

The method of any of embodiments 1-10, wherein the intersection is a stop intersection, wherein determining the time period for the intersection comprises:
- identifying a size for the platoon of vehicles; and
- calculating, based on the size of the platoon of vehicles, a time until the platoon of vehicles arrives at the stop intersection,
- wherein the platoon command instructs the platoon of vehicles to cross the stop intersection without dissociation.

Embodiment 12

The method of any of embodiments 1-11, wherein the first vehicle is a lead vehicle of the platoon of vehicles.

Embodiment 13

An apparatus, configured to perform and/or control the method of any of embodiments 1-12 or comprising means for performing and/or controlling any of embodiments 1-12.

Embodiment 14

An apparatus, comprising at least one processor and at least one memory including computer program code for one or more programs, the at least one memory and the computer program code configured to, with the at least one processor, to perform and/or control the method of any of embodiments 1-12.

Embodiment 15

A computer program comprising instructions operable to cause a processor to perform and/or control the method of any of embodiments 1-12, when the computer program is executed on the processor.

We claim:

1. A method for controlling a platoon of vehicles through an intersection, the method comprising:
    receiving location data for at least a first vehicle of the platoon of vehicles, the location data derived from output of a sensor configured to track movement of the first vehicle;
    map matching the location data for the first vehicle to a road network;
    identifying a ramp intersection in the road network in response to the matched location data;
    determining a time period for the ramp intersection, wherein determining the time period for the ramp intersection comprises:
    receiving traffic data for the ramp intersection from a traffic service; and
    calculating, by a processor, based on the traffic data, a time until the ramp intersection includes space for the platoon of vehicles;
    calculating, by the processor, a distance to the intersection for a second vehicle of the platoon of vehicles;
    calculating, by the processor, a travel time based on the distance to the intersection for the second vehicle of the platoon of vehicles;
    performing, by the processor, a comparison of the time period for the intersection to the travel time for the second vehicle; and
    generating, by the processor, a platoon command in response to the comparison.

2. The method of claim 1, wherein calculating the distance to the ramp intersection for the second vehicle of the platoon of vehicles comprises:
    calculating a platoon length based on a quantity of vehicles in the platoon of vehicles, one or more vehicles lengths, a quantity of gaps between vehicles, and one or more gap distances.

3. The method of claim 1, wherein the platoon command instructs the first vehicle or the second vehicle to adjust speed.

4. The method of claim 1, wherein the platoon command instructs the first vehicle to send a driving command to the second vehicle or another vehicle of the platoon of vehicles.

5. The method of claim 1, wherein in response to the determination of whether the ramp intersection includes space for the platoon of vehicles, the platoon command instructs the first vehicle or a second vehicle to adjust speed to perform a correction.

6. The method of claim 5, wherein the correction includes an increase of a speed of the platoon to reach the ramp intersection before capacity is too low.

7. The method of claim 5, wherein the correction includes a decrease of the speed of the platoon so that traffic clears at the ramp intersection.

8. The method of claim 5, wherein the correction includes a reroute for the platoon to avoid the ramp intersection.

9. The method of claim 5, wherein the correction includes a reduction in a gap distance between the first vehicle and the second vehicle.

10. An apparatus comprising:
    a location module configured to receive location data from at least one sensor tracking movement for at least a vehicle of a platoon of vehicles;
    a geographic database configured to store data indicative of a road network;
    an intersection module configured to match the location data for the vehicle to a ramp intersection of the road network stored in the geographic database;
    a timing module configured to identify a time period for the intersection of the road network matched with the location data for the vehicle, wherein identification of the time period for the ramp intersection comprises calculating, based on traffic data, a time until the ramp includes space for the platoon of vehicles; and
    a controller configured to calculate a travel time to the intersection and configured to perform a comparison of the time period for the intersection to the travel time to the ramp intersection, wherein the controller generates a platoon command in response to the comparison.

11. The apparatus of claim 10, wherein in response to the determination of whether the ramp intersection includes space for the platoon of vehicles, the platoon command instructs the at least one vehicle in the platoon of vehicles to adjust speed to perform a correction.

12. The apparatus of claim 11, wherein the correction includes an increase of a speed of the platoon of vehicles to reach the ramp intersection before capacity is too low.

13. The apparatus of claim 11, wherein the correction includes a decrease of the speed of the platoon of vehicles so that traffic clears at the ramp intersection.

14. The apparatus of claim 11, wherein the correction includes a reroute for the platoon to avoid the ramp intersection.

15. The apparatus of claim 10, wherein the correction includes a reduction in a gap distance between consecutive vehicles in the platoon of vehicles.

16. A non-transitory computer readable medium including instructions to perform a method comprising:
    generating, using position circuitry, location data for a platoon of vehicles;
    sending the location data to a server;
    receiving, from the server, intersection data for an upcoming ramp intersection, the intersection data indicative of a passable condition of the ramp intersection, wherein the intersection data is indicative of traffic for the upcoming ramp and the passable condition in indicated by a time until the upcoming ramp includes space for the platoon of vehicles;
    performing a determination of whether the platoon of vehicles can pass the ramp intersection without interruption of the platoon based on the passable condition of the ramp intersection; and
    generating a platoon command to increase or decrease a speed of the platoon of vehicles in response to the determination of whether the platoon of vehicles can pass the upcoming ramp intersection without interruption.

17. The non-transitory computer readable medium of claim 16, wherein in response to the determination of the passable condition, the platoon command instructs the first vehicle or a second vehicle to adjust speed to perform one or more of the following corrections:

to speed up the platoon to reach the ramp before congestion causes capacity of the ramp intersection to be too low;

to slow down the platoon to give time for traffic to clear and capacity of the ramp intersection to increase; or to reroute the platoon to find another ramp with enough capacity; or to reduce a gap distance between vehicles in the platoon of vehicles.

18. The non-transitory computer readable medium of claim 16, wherein in response to the passable condition, the platoon command instructs the first vehicle or a second vehicle to change the formation of the platoon from a single line platoon to have two or more parallel lines to allow the platoon to fit in the ramp intersection.

19. The non-transitory computer readable medium of claim 18, wherein the platoon command instructs the first vehicle to send a driving command to another vehicle of the platoon of vehicles.

* * * * *